US012568124B2

(12) United States Patent
Levering et al.

(10) Patent No.: US 12,568,124 B2
(45) Date of Patent: Mar. 3, 2026

(54) GENERATING AND PROVIDING VARIOUS DEGREES OF DIGITAL INFORMATION AND ACCOUNT-BASED FUNCTIONALITY BASED ON A PREDICTED NETWORK SECURITY THREAT

(71) Applicant: Chime Financial, Inc., San Francisco, CA (US)

(72) Inventors: Joe Levering, Chicago, IL (US); Ryan Bahniuk, Chicago, IL (US); Lace Cheung, San Francisco, CA (US); Kevin Shu, Chicago, IL (US); Jocelyn Takahashi, San Francisco, CA (US); Dain Hall, Chicago, IL (US); Jeremy Steinberg, Chicago, IL (US); Varun Rai, Milpitas, CA (US); Charles Kirk, Chicago, IL (US)

(73) Assignee: Chime Financial, Inc., San Francisco, CA (US)

( * ) Notice: Subject to any disclaimer, the term of this patent is extended or adjusted under 35 U.S.C. 154(b) by 210 days.

(21) Appl. No.: 18/484,216

(22) Filed: Oct. 10, 2023

(65) Prior Publication Data

US 2024/0121276 A1 Apr. 11, 2024

Related U.S. Application Data

(60) Provisional application No. 63/378,825, filed on Oct. 7, 2022.

(51) Int. Cl.
*H04L 9/40* (2022.01)

(52) U.S. Cl.
CPC ............ *H04L 63/205* (2013.01); *H04L 63/08* (2013.01); *H04L 63/105* (2013.01)

(58) Field of Classification Search
CPC ...... H04L 63/205; H04L 63/08; H04L 63/105
See application file for complete search history.

(56) References Cited

U.S. PATENT DOCUMENTS

| | | | |
|---|---|---|---|
| 7,180,776 B1 * | 2/2007 | Wennekamp .......... | G11C 16/22 |
| | | | 326/38 |
| 9,191,382 B1 * | 11/2015 | Hornung ................. | H04L 63/08 |
| 9,549,319 B1 * | 1/2017 | Butler ................... | H04L 63/107 |

(Continued)

*Primary Examiner* — Aravind K Moorthy
(74) *Attorney, Agent, or Firm* — Keller Preece PLLC

(57) ABSTRACT

This disclosure describes embodiments of systems, methods, and non-transitory computer-readable storage media that can solve one or more of the foregoing (or other problems) in the art in addition to providing other benefits by applying customized security limitations to a secure digital account, and removing the security limitations based on efficiently verifying personal identity information associated with the secure digital account. For example, the disclosed system can receive a user interaction associated with a secure digital account and determine a fraud risk score corresponding to the interaction. The system can then assign the secure digital account a security tier and apply appropriate security limitations based on the security tier that corresponds with a determined risk of fraud. The system may request a personal identity verification and based on the verification matching stored information corresponding to the secure digital account, remove the security limitations from the secure digital account.

20 Claims, 11 Drawing Sheets

(56) References Cited

U.S. PATENT DOCUMENTS

| | | | | |
|---|---|---|---|---|
| 9,838,383 | B1* | 12/2017 | Perlmuter | H04L 63/083 |
| 10,149,136 | B1* | 12/2018 | Sathya | H04L 9/0816 |
| 10,257,202 | B1* | 4/2019 | Jiang | G06F 21/313 |
| 10,652,283 | B1* | 5/2020 | Harvey | G06F 9/45558 |
| 10,664,538 | B1* | 5/2020 | Pallemulle | G06F 16/9038 |
| 11,562,362 | B1* | 1/2023 | Chang | G06Q 20/10 |
| 11,606,690 | B1* | 3/2023 | Robinson | H04W 84/12 |
| 11,677,557 | B1* | 6/2023 | Tree | H04L 9/3271 |
| | | | | 713/168 |
| 12,035,136 | B1* | 7/2024 | Shahidzadeh | H04L 63/1425 |
| 2005/0080897 | A1* | 4/2005 | Braun | H04L 63/105 |
| | | | | 709/225 |
| 2005/0204148 | A1* | 9/2005 | Mayo | H04L 63/0815 |
| | | | | 713/172 |
| 2006/0020813 | A1* | 1/2006 | Birk | H04L 63/0815 |
| | | | | 713/182 |
| 2006/0190990 | A1* | 8/2006 | Gruper | H04L 63/08 |
| | | | | 726/3 |
| 2006/0242713 | A1* | 10/2006 | Ruzyski | G06F 21/6218 |
| | | | | 726/26 |
| 2007/0180086 | A1* | 8/2007 | Fang | H04L 41/28 |
| | | | | 709/223 |
| 2007/0180501 | A1* | 8/2007 | Yadav | G06F 21/6218 |
| | | | | 726/5 |
| 2007/0180502 | A1* | 8/2007 | Yadav | G06F 9/45512 |
| | | | | 726/5 |
| 2008/0154668 | A1* | 6/2008 | Kuo | G06Q 30/0247 |
| | | | | 705/7.38 |
| 2008/0247773 | A1* | 10/2008 | Matsuura | G03G 21/04 |
| | | | | 399/84 |
| 2011/0185401 | A1* | 7/2011 | Bak | G06F 16/9024 |
| | | | | 726/5 |
| 2012/0192251 | A1* | 7/2012 | Faiman | H04L 63/105 |
| | | | | 726/3 |
| 2013/0036454 | A1* | 2/2013 | Purvis | G06F 21/6218 |
| | | | | 726/4 |
| 2013/0326605 | A1* | 12/2013 | Betz | G06F 21/31 |
| | | | | 726/7 |
| 2014/0196115 | A1* | 7/2014 | Pelykh | H04L 63/08 |
| | | | | 726/4 |
| 2014/0330969 | A1* | 11/2014 | Duby | H04L 65/1069 |
| | | | | 709/225 |
| 2015/0172264 | A1* | 6/2015 | Hardy | H04W 4/80 |
| | | | | 726/4 |
| 2016/0050209 | A1* | 2/2016 | Govande | H04L 63/101 |
| | | | | 726/7 |
| 2016/0057138 | A1* | 2/2016 | Hoyos | G06V 40/168 |
| | | | | 726/7 |
| 2016/0062595 | A1* | 3/2016 | Yamaguchi | G06F 9/4451 |
| | | | | 715/741 |
| 2016/0065370 | A1* | 3/2016 | Le Saint | H04L 9/321 |
| | | | | 713/155 |
| 2016/0112399 | A1* | 4/2016 | Ogawa | H04L 9/3226 |
| | | | | 726/5 |
| 2016/0205083 | A1* | 7/2016 | Kusens | H04L 63/08 |
| | | | | 726/4 |
| 2016/0285690 | A1* | 9/2016 | Hardy | H04L 47/20 |
| 2016/0373478 | A1* | 12/2016 | Doubleday | G06F 8/65 |
| 2017/0078326 | A1* | 3/2017 | Child | H04L 63/1483 |
| 2017/0098086 | A1* | 4/2017 | Hoernecke | G06F 11/3688 |
| 2018/0139238 | A1* | 5/2018 | Schultz | H04L 63/0272 |
| 2018/0285298 | A1* | 10/2018 | Lillie | G06F 30/18 |
| 2019/0050557 | A1* | 2/2019 | Martin | H04L 63/08 |
| 2019/0098023 | A1* | 3/2019 | Dinerstein | G06F 21/554 |
| 2019/0116172 | A1* | 4/2019 | Caldwell | H04L 67/306 |
| 2019/0141140 | A1* | 5/2019 | Bal | H04L 63/08 |
| 2019/0205885 | A1* | 7/2019 | Lim | H04L 63/1425 |
| 2020/0021591 | A1* | 1/2020 | Hecht | H04L 63/10 |
| 2020/0028926 | A1* | 1/2020 | Sprague | H04L 9/0877 |
| 2020/0036749 | A1* | 1/2020 | Ferres | G06F 16/95 |
| 2020/0137109 | A1* | 4/2020 | Endler | H04L 63/1433 |
| 2020/0265152 | A1* | 8/2020 | Ohashi | A63F 13/69 |
| 2020/0320187 | A1* | 10/2020 | Ide | G06F 21/45 |
| 2020/0334347 | A1* | 10/2020 | Hoyos | H04L 63/0861 |
| 2020/0389496 | A1* | 12/2020 | Xuan | H04L 63/10 |
| 2021/0158348 | A1* | 5/2021 | Wardman | H04W 4/24 |
| 2021/0176249 | A1* | 6/2021 | Bakshi | H04L 63/0853 |
| 2021/0294901 | A1* | 9/2021 | Agarwwal | H04L 41/145 |
| 2022/0006823 | A1* | 1/2022 | Tse | H04L 63/1416 |
| 2022/0012341 | A1* | 1/2022 | Sarkar | G06F 21/562 |
| 2022/0029874 | A1* | 1/2022 | Busbee | H04L 41/22 |
| 2022/0038784 | A1* | 2/2022 | Roh | H04N 21/2743 |
| 2022/0108315 | A1* | 4/2022 | Gorog | H04L 9/0877 |
| 2022/0210151 | A1* | 6/2022 | Williams | H04L 63/0861 |
| 2022/0245643 | A1* | 8/2022 | Venkatasubramaniam | |
| | | | | G06N 3/08 |
| 2022/0329588 | A1* | 10/2022 | Szigeti | H04L 63/107 |
| 2022/0350877 | A1* | 11/2022 | Whitcomb | G06F 21/445 |
| 2022/0385975 | A1* | 12/2022 | Chen | H04N 21/4666 |
| 2023/0004655 | A1* | 1/2023 | Poulin | G06F 21/577 |
| 2023/0110111 | A1* | 4/2023 | Royal | H04L 63/0884 |
| | | | | 726/1 |
| 2023/0111621 | A1* | 4/2023 | Kumar | G06N 3/088 |
| | | | | 705/38 |
| 2023/0138423 | A1* | 5/2023 | Wurmfeld | G06F 16/90335 |
| | | | | 707/724 |
| 2023/0229468 | A1* | 7/2023 | Vijayvargiya | G06F 9/452 |
| | | | | 718/1 |
| 2023/0239290 | A1* | 7/2023 | Guan | H04L 63/105 |
| | | | | 726/6 |
| 2023/0259631 | A1* | 8/2023 | Zawadzki | G06N 3/0464 |
| | | | | 726/22 |
| 2023/0259948 | A1* | 8/2023 | Paulson | G06Q 20/405 |
| | | | | 705/44 |
| 2023/0334339 | A1* | 10/2023 | Lowe | G06F 16/9535 |
| 2023/0394714 | A1* | 12/2023 | Namasivayam | G06T 11/00 |
| 2023/0396649 | A1* | 12/2023 | Mathur | H04L 63/1425 |
| 2024/0040383 | A1* | 2/2024 | Saini | H04W 12/08 |
| 2024/0146720 | A1* | 5/2024 | Saravanan | H04L 63/0823 |
| 2024/0305650 | A1* | 9/2024 | Tian | G06N 3/0455 |

* cited by examiner

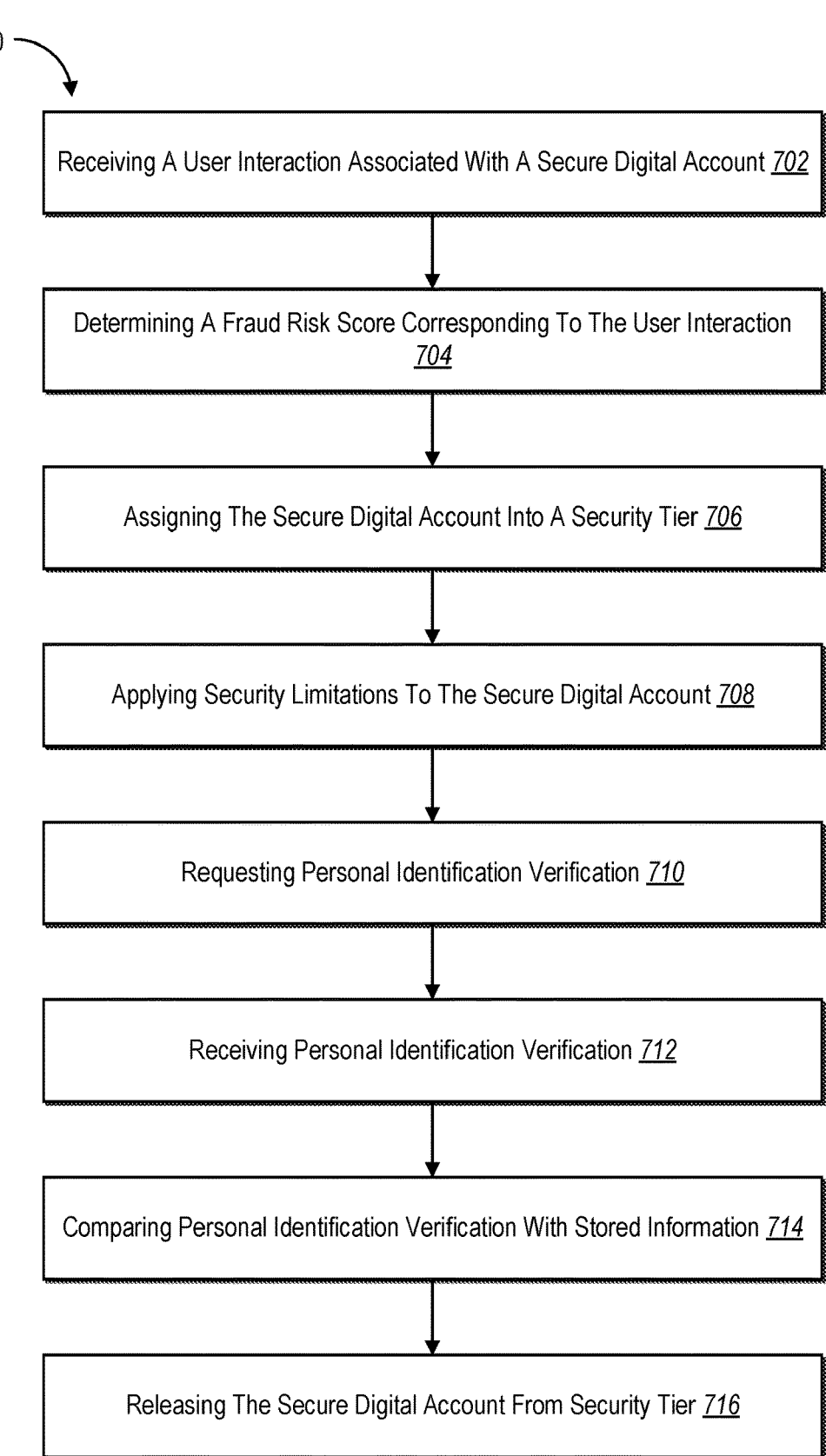

Receiving A User Interaction Associated With A Secure Digital Account 702

Determining A Fraud Risk Score Corresponding To The User Interaction 704

Assigning The Secure Digital Account Into A Security Tier 706

Applying Security Limitations To The Secure Digital Account 708

Requesting Personal Identification Verification 710

Receiving Personal Identification Verification 712

Comparing Personal Identification Verification With Stored Information 714

Releasing The Secure Digital Account From Security Tier 716

*Fig. 7*

GENERATING AND PROVIDING VARIOUS DEGREES OF DIGITAL INFORMATION AND ACCOUNT-BASED FUNCTIONALITY BASED ON A PREDICTED NETWORK SECURITY THREAT

CROSS-REFERENCE TO RELATED APPLICATIONS

This application claims the benefit of, and priority to U.S. Provisional Application No. 63/378,825, filed on Oct. 7, 2022. The aforementioned application is incorporated by reference in its entirety.

BACKGROUND

Recent years have seen significant developments in network security systems that manage sensitive information used on mobile-based applications. In fact, the growing popularity of mobile-based applications that store sensitive financial information and facilitate financial transactions has led to increases in fraudulent transactions, cyber account hacking, and account takeovers. With this increase in fraudulent activity, existing systems have enacted measures to protect personal identity information, account access, and other confidential information over computer networks.

Even though existing systems provide various security features, they face multiple drawbacks or deficiencies in relation to efficiency, security, and flexibility. For example, when an account holder experiences an account takeover, where a bad actor infiltrates and takes control of a digital account, conventional systems often attempt to protect account information by logging out an account holder's devices from the mobile-based application, which can result in the account holder having to submit numerous documents to the mobile-based application system to eventually regain access to their account through the mobile-based application. The process to regain access to their account can be time intensive and, in some cases, may take several days. In addition, from the existing computing system standpoint, the process to regain access to accounts needlessly expends significant computational resources by requiring systems to unnecessarily store and process several documents.

On top of the computing inefficiencies, existing systems suffer from security issues. For example, existing systems typically receive and store sensitive documents used to verify a user identity within various channels (e.g., SMS, email), thereby increasing the likelihood of exposing such information to unwanted parties. Indeed, existing systems often lack the functionality to securely and quickly receive sensitive information that can be used to accurately identify a user and securely grant access to a potentially compromised account. Accordingly, existing systems often create potential security issues for a user's sensitive information in response to trying to avoid a detected security issue.

In addition to the security concerns, existing systems generate graphical user interface inefficiencies by compelling users to navigate through multiple graphical user interfaces, websites, and applications to gather and send various documentation to regain access to an account that has been locked. Indeed, and as explained above, existing systems often have a user provide documentation through email, SMS messaging, or other communication channels. Accordingly, the user often has to take multiple steps through various applications and graphical user interfaces to provide information that proves their identity and allows them to regain access to the account.

In addition to security concerns, conventional systems are inflexible. For example, when faced with an account takeover, conventional systems often logout all devices associated with the financial account with little to no discretion as to whether the device is or is not involved with the fraudulent activity. Moreover, conventional systems often rigidly require users to provide specific verifying information before granting the account holder's device access to their account and accompanying information. This inflexibility further exacerbates the security and efficiency concerns previously discussed. These, along with additional problems and issues, exist with regard to conventional network transaction security systems.

SUMMARY

This disclosure describes embodiments of systems, methods, and non-transitory computer-readable storage media that can solve one or more of the foregoing (or other problems) in the art in addition to providing other benefits by applying customized security limitations to a secure digital account, and removing the security limitations based on efficiently verifying personal identity information associated with the secure digital account. For example, the disclosed system can receive a user interaction associated with a secure digital account and determine a fraud risk score corresponding to the interaction. The system can then assign the secure digital account a security tier and apply appropriate security limitations based on the security tier that corresponds with a determined risk of fraud. The system may request a personal identity verification and based on the verification matching stored information corresponding to the secure digital account, remove the security limitations from the secure digital account.

BRIEF DESCRIPTION OF THE DRAWINGS

The detailed description provides one or more embodiments with additional specificity and detail through the use of the accompanying drawings, as briefly described below.

FIG. 3 illustrates an example diagram for extracting user interaction features and generating a fraud risk score in accordance with one or more embodiments.

FIG. 7 illustrates an example series of acts for generating a fraud risk score, limiting access to account features, and removing those security limitations in accordance with one or more embodiments.

DETAILED DESCRIPTION

Figure 1:
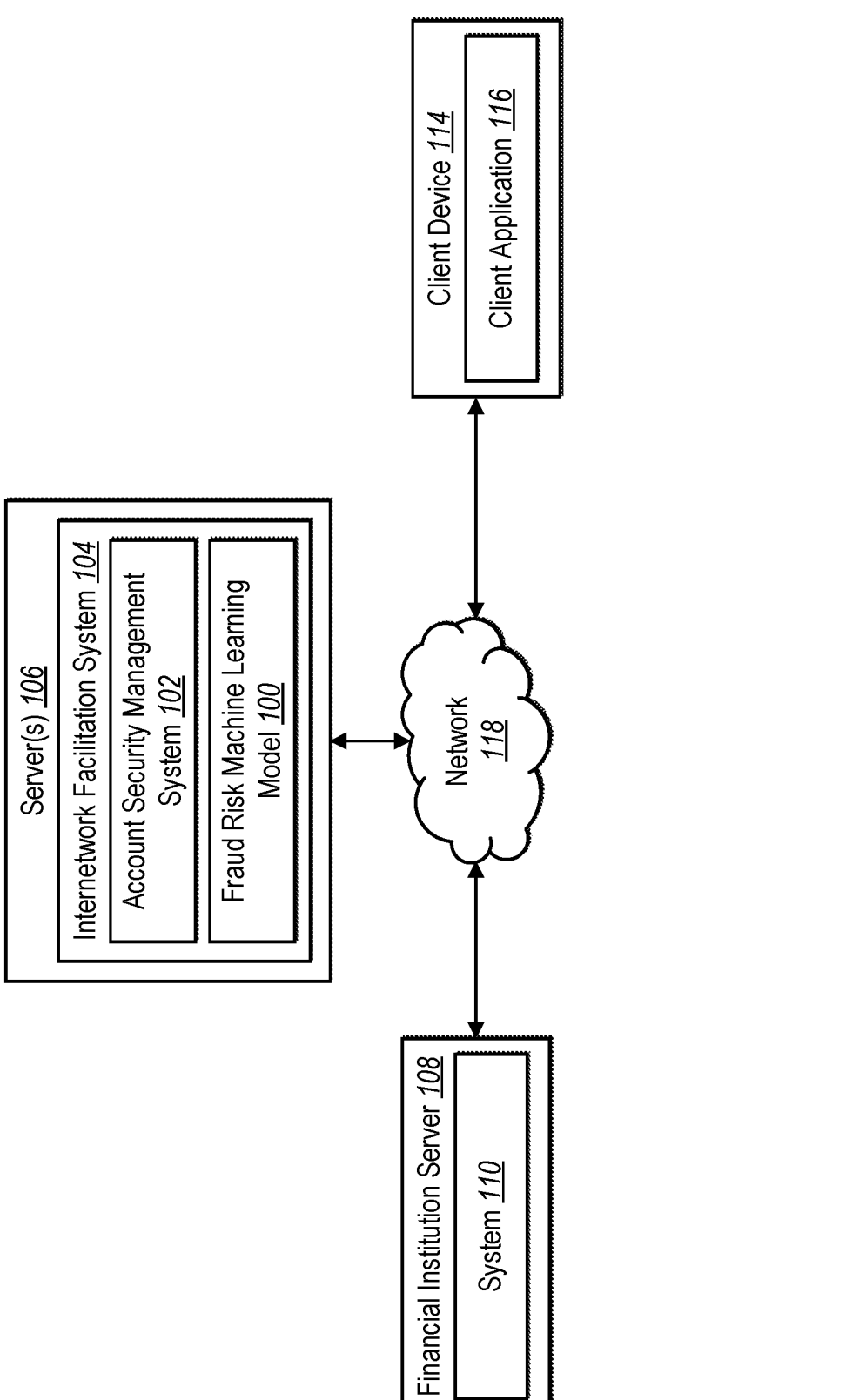
FIG. 1 illustrates a block diagram of an environment in which an account security management system can operate in accordance with one or more embodiments.

This disclosure describes embodiments of an account security management system that dynamically safeguards a secure digital account upon detecting a risk associated with the account and efficiently releases the secure digital account through personal identity verification. For instance, the account security management system may receive a user interaction associated with a secure digital account and determine a fraud risk score associated with the user interaction. Based on the fraud risk score, the account security management system may place the secure digital account into a security tier and apply security limitations to the secure digital account. The account security management system may then release the secure digital account from the security tier by utilizing personal identity verification.

For example, the account security management system may determine a fraud risk score for a user interaction. To illustrate, the account security management system may receive an indication of a user action within an application, a message, an email, or a voicemail from a secure digital account user indicating a suspected fraudulent transaction and/or activity (e.g., unauthorized purchase, fund transfer, or monetary withdrawal). Once the account security management system receives the user interaction, the account security management system may identify features associated with the interaction, the client device, the secure digital account, and/or the transaction. After the account security management system identifies the associated features, it may then utilize machine-learning models to process the associated features and calculate the fraud risk score. Based on the fraud score exceeding a certain threshold, the account security management system may assign the secure digital account into a security tier.

As indicated above, the account security management system can assign a secure digital account into a security tier based on a fraud risk score corresponding to a user's interaction. For example, a security tier can correspond with a fraud risk score range, and the account security management system places various limitations on account actions connected to the secure digital account based on the security tier. To illustrate, a user interaction with a high fraud risk score places the corresponding secure digital account into a security tier with more restrictive security limitations. For instance, if a secure digital account is placed in the highest security tier, all client devices associated with the secure digital account will be logged out of the secure digital account and denied all access to the secure digital account. Once the client device(s) is deprived of access to the secure digital account, the account security management system keeps the secure digital account in the security tier. However, the client device may re-gain access to the secure digital account and corresponding account actions after the account security management system requests and authenticates a personal identity verification from the client device.

As discussed above, the account security management system may release a secure digital account from a security tier. Releasing the secure digital account from the security tier removes security limitations from the secure digital account and allows client devices to access the secure digital account and perform any and all account actions. For example, to release the secure digital account from the security tier, the account security management system requests a personal identity verification. The account security management system receives the personal identity verification and compares it to stored personal information corresponding to the secure digital account. Once the account security management system confirms that the received personal identity verification matches stored personal information, the account security management system releases the secure digital account from the security tier.

The account security management system provides several technical advantages over existing systems. For example, the account security management system increases computational efficiency by providing access to a secure digital account without needlessly storing and processing numerous documents. In fact, by decreasing the amount of processed data, the account security management system allows client devices to regain access to accounts, while opening up storage and computational resources.

In addition to improving computational efficiencies, the account security management system improves security measures. For example, the security management system decreases the risk of exposing sensitive and private information by requesting and comparing fewer documents, thus allowing a client device to more quickly and securely regain access to the secure digital account. By capping the amount of sensitive information a user shares to regain access to their potentially compromised secure digital account, the account security manager ensures that sensitive information does not fall into unwanted hands.

On top of improving security and computing inefficiencies, the account security management system improves graphical user interface efficiencies. For example, a user does not have to navigate through several various layers of websites, applications, or graphical user interfaces to provide information that allows them to regain access to their secure digital account. In fact, the account security management system allows the user to regain access to their secure digital account while navigating through fewer graphical interfaces and applications.

In addition to security and computational inefficiencies, the account security management system provides more flexibility. To illustrate, unlike conventional systems that logout all devices regardless of whether or not it was involved with fraudulent activity, the account security management system may place varying account limitations on different client devices associated with the same secure digital account. As another example, unlike conventional systems that require users to provide specific documents before granting access to the user's device, the account security management system may allow users to provide varied forms of documentation in order for their devices to securely regain access to their secure digital account.

Moreover, the account security management system solves various problems that arise in the technological environment of mobile accessible secure account systems. Indeed, the specific technological environment introduces problems associated with bad actors being to spoof or steal credential information used to access a secure account, which in turn leads to security issues, including privatized data. Existing systems take a draconian approach and simply lock an account upon detecting any perceived security threat. This action, however, presents another host of problems within the mobile accessible secure account system environment. For example, because the secure accounts are accessed from mobile computing devices, it is frequent that a user travels or changes a device. However, a different GPS location or MAC address associated with a login is often a signal to existing systems to lock an account, when it is often the case the user is authorized to access the secure account but happens to be traveling or happens to have just updated a device. Accordingly, existing system introduce a huge amount of inefficiency while also providing a lot of needless access friction. The various example embodiments of the account security management system described herein solve these problems that arise within this technological environment.

As illustrated by the foregoing discussion, the present disclosure utilizes a variety of terms to describe features and benefits of the account security management system. Additional detail is now provided regarding the meaning of these terms. As used herein, the term "secure digital account" refers to a collection of digital information (e.g., a collection of sensitive information corresponding to a user within an online system that utilizes various security methods to protect the sensitive information therein). For instance, a secure digital account may include a financial account, a personal information account, or a password or key account maintained at one or more remote servers. In one embodiment, where the secure digital account is a financial account, a user may transfer funds, initiate purchases or access sensitive information (e.g., credit card numbers, account numbers, passwords, personal information, etc.) corresponding to the secure digital account.

As used herein, the term "account action" refers to an act a user may take in conjunction with a secure digital account. An account action could include accessing sensitive information stored on a secure digital account or exchanging data from the secure digital account to a third-party. For example, account actions related to a financial account may include, but are not limited to, virtual card purchases, physical card purchases, fund transfers, fund withdrawals, online bill pay, viewing secure digital account information, changing passwords, or updating personal information. In some embodiments, an account action may be initiated by the user or scheduled to occur automatically at specific times.

As used herein, the term "fraud risk score" refers to a value indicating a likelihood that a user interaction associated with a secure digital account is fraudulent. In some embodiments, the fraud risk score may be a measure, classification, a probability, or metric indicating a likelihood that a corresponding user interaction is potentially fraudulent action. For example, a fraud risk score may comprise a numerical score (e.g., a number, a fraction, a decimal, or other numerical value) indicating the degree to which a fraud risk machine-learning model predicts that the corresponding user interaction signals a fraudulent online purchase, fraudulent transfer, account takeover, or other user interaction. In other embodiments, the fraud risk score could be a classifier (e.g., a binary classification such as "0" or "1") denoting a prediction that a corresponding user interaction indicates an account takeover or unauthorized fund transfer.

As used herein, the term "security tier" refers to a designated security level that corresponds to a fraud risk score. The security tier may specify the amount of protection given to a secure digital account. For instance, a security tier may protect a secure digital account from future fraudulent activities by placing security limitations on various account actions. Examples of security tiers may include, but are not limited to, denying client devices access to the secure digital account, partially limiting client devices access to the secure digital account, or granting client devices full access to the secure digital account. To illustrate, a user interaction with a high fraud risk score may indicate a high likelihood of an unauthorized fund transfer. Accordingly, the account security management system may assign the secure digital account into the most restrictive security tier, which locks out all client devices associated with the secure digital account and prevents any client device corresponding to the secure digital account from performing additional account actions. In some embodiments, individual client devices associated with the secure digital account may be placed in different security tiers.

As used herein, the term "security limitation" refers to restrictions, limitations, or denial of access to certain account activities or information associated with a secure digital account. As mentioned above, the account security management system applies security limitations to the secure digital account based on the security tier. In some embodiments, security limitations may limit account activities to specific geographical regions or to particular merchants. Other examples of security limitations include, but are not limited to, denying access to account information (e.g., account balances, recent transactions, etc.), placing spending restrictions on all purchases, obstructing online purchases, or preventing fund transfers. For example, a secure digital account in a security tier may have security limitations that only allow physical card transactions and access to account balances. Additionally, in other embodiments, the account security management system may apply differing security limitations on different individual client devices associated with the same secure digital account.

As used herein, the term "personal identity verification" refers to personal identity information, data, or evidence that authenticates an individual's identity. In some embodiments, personal identity verification may be biometric data and/or markers (e.g., fingerprints, retinal scans, DNA, facial scans, etc.). In other embodiments, personal identity verification may be an image of an identification document. Examples of personal identity verification document include, but are not limited to, a driver's license, passport, tax identification number, and/or state identification card. In some embodiments, the personal identity verification may be a digital image. For example, the account security management system may request a picture of a user's identification card (e.g., a state driver license) from the client device. In other embodiments, the personal identity verification may include one or more of text data, digital image data, or digital video data comprising identification information.

Additional detail regarding the account security management system will now be provided with reference to the figures. In particular, FIG. 1 illustrates a block diagram of a system environment for implementing an account security management system 102 in accordance with one or more embodiments. As shown in FIG. 1, the environment includes server(s) 106 hosting the account security management system 102 as part of an inter-network facilitation system 104. The environment of FIG. 1 further includes a client device 114 with corresponding client application 116, and a financial institution server 108. The term a "client device" refers to a device that is associated with and may access a secure digital account through the client application or web-browser. For example, a client device may use credentials associated with the secure digital account to see recent transactions, make purchases, or view account balances. The server(s) 106 can include one or more computing devices to implement the account security management system 102. Additional description regarding the illustrated computing devices (e.g., the server(s) 106, the client device 114, the financial institution server 108, and the network 112) is provided with respect to FIGS. 8-9 below.

As shown, the account security management system 102 utilizes a network 118 to communicate with client device 114 and/or the financial institution server 108. The network 118 may comprise any network described in FIGS. 8-9. For example, the account security management system 102 communicates with the client device 114 and/or the financial institution server 108 to provide and receive information related to network transactions and regaining access to a secure digital account. Indeed, the inter-network facilitation system 104 or the account security management system 102 can receive a potentially fraudulent user interaction associated with a secure digital account. In response, the account security management system 102 can utilize a fraud risk machine-learning model 100 to generate a fraud risk score. Based on the fraud risk score, the account security management system 102 may then place the secure digital account into a security tier, limit account actions, and request personal identity verification. If the personal identity verification associated with the secure digital account matches the stored information corresponding to the secure digital account, the account security management system 102 removes the security limitations.

As indicated by FIG. 1, the client device 114 respectively includes a client application 116. In one or more embodiments, the inter-network facilitation system 104 or the account security management system 102 communicates with the client device 114 to, for example, receive and provide information including, but not limited to, a secure digital account associated with the client device 114, device features, user interaction features, account features, transaction features, and/or network features. For example, the account security management system 102 may request personal identity verification from client device 114 through the client application 116, respectively.

In some cases, the inter-network facilitation system 104 or the account security management system 102 further communicates with the client device 114 to limit account actions associated with a secure digital account. In particular, the inter-network facilitation system 104 or the account security management system 102 can determine that a fraud risk score generated by fraud risk machine-learning model 100 falls into a range associated with a security tier and limit account activities based on the security tier. For example, the inter-network facilitation system 104 or the account security management system communicates with the client device 114 (e.g., via the client application 116) to logout the client device 114 from the client application 116 and deny all access to the secure digital account.

In some embodiments, the inter-network facilitation system 104 or the account security management system 102 can provide (and/or cause the client device 114 to display or render) visual elements within a graphical user interface associated with client device 114 (e.g., within client application 116). For example, the inter-network facilitation system 104 or the account security management system 102 can provide a graphical user interface that can provide secure account information via the client device 114.

Although FIG. 1 illustrates the environment having a particular number and arrangement of components associated with the account security management system 102, in some embodiments, the environment may include more or fewer components with varying configurations. For example, in some embodiments, the inter-network facilitation system 104 or the account security management system 102 can communicate directly to the client device 114, bypassing the network 112. In these or other embodiments, the inter-network facilitation system 104 or the account security management system 102 can be housed (entirely or in part) on the client device 114. Additionally, the inter-network facilitation system 104 or the account security management system 102 can include or communicate with a database for storing information, such as account information or network transaction information.

Figure 2:
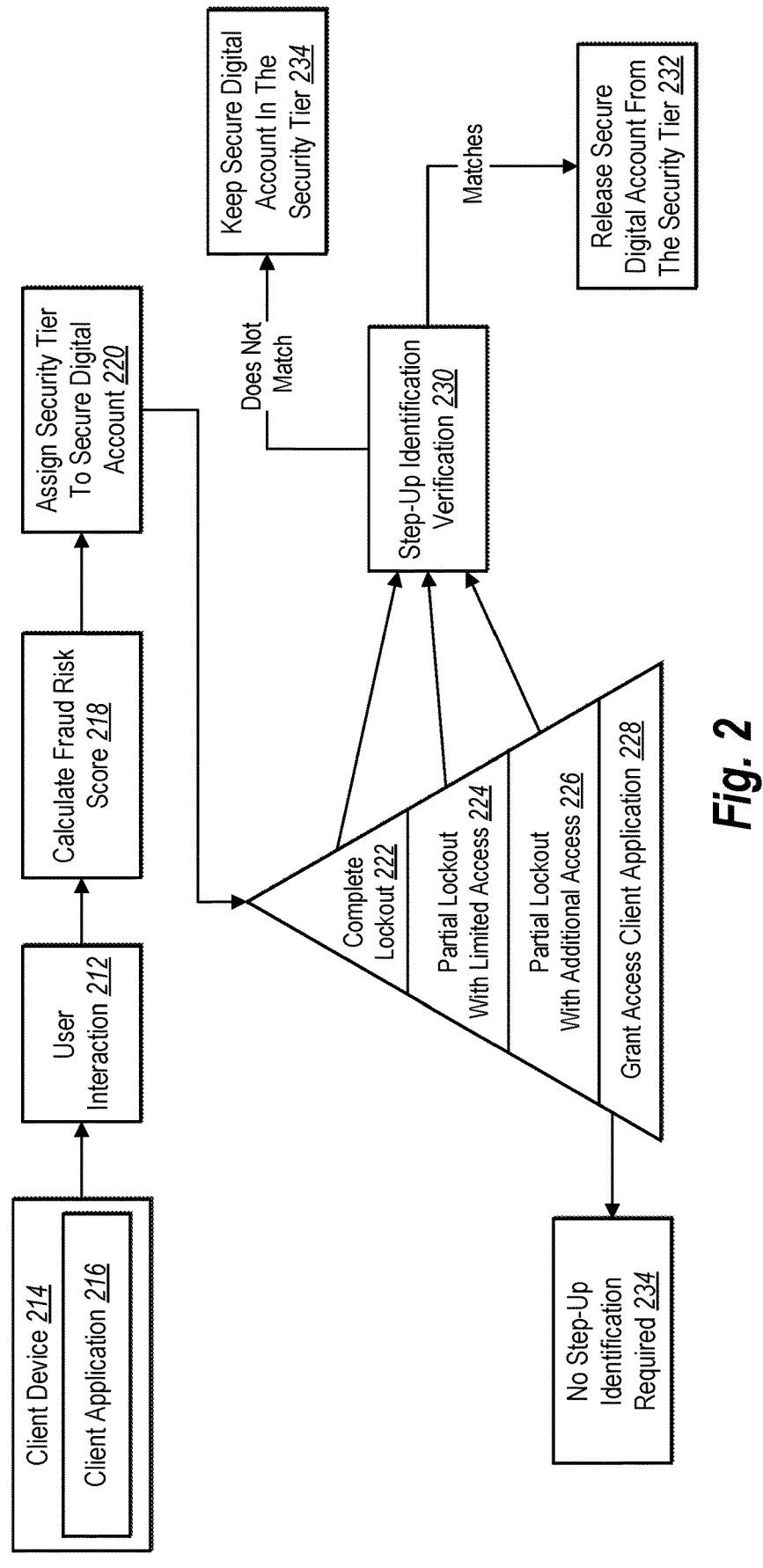
FIG. 2 illustrates an example sequence flow for an account security management system generating a fraud risk score, assigning a security tier to a secure digital account, and removing security limitations placed on the secure digital account in accordance with one or more embodiments.

As mentioned, in some embodiments, the account security management system 102 can help a client device 114 fully regain access to a secure digital account after potentially fraudulent activity (e.g., account take over event, account hack, unauthorized access) resulted in the account security management system 102 applying restrictions on account actions. FIG. 2 illustrates an overview of the account security management system 102 utilizing a fraud risk score, security tier, and step-up identity verification to help a client device 214 regain access to a secure digital account in accordance with one or more embodiments. Thereafter, the description of subsequent figures provides additional detail regarding specific acts or components of the account security management system 102.

As shown in FIG. 2, the account security management system 102 can perform an act of receiving a user interaction associated with a secure digital account. More specifically, the account security management system 102 receives a user interaction 212 associated with a secure digital account by receiving any indication that an activity associated with the secure digital account is potentially fraudulent account activity. Examples of fraudulent account activities include, but are not limited to, an account take over event, an account hack, unauthorized access to a secure digital account, stolen virtual card information, fraudulently draining accounts, unauthorized fund transfers (e.g., peer-to-peer transfers), unauthorized login credential changes, and/or hackers locking a user out of their secure digital account. For example, the account security management system 102 can receive an indication that an activity associated with the secure digital account is fraudulent by receiving a message that a user cannot log into their account and did not change personal login credentials associated with the secure digital account. In some embodiments, the account security management system 102 can receive an indication of fraudulent account activity through a phone call reporting an unauthorized fund transfer or stolen virtual card information. In other embodiments, peculiar or unusual account activities may also constitute receiving an indication of fraudulent account activity. In some instances, the account security management system 102 may receive an indication of fraudulent activity from a client device 214. In other cases, the account security management system 102 may receive an indication of fraudulent activity from the client device via the client application 216.

As further illustrated, after receiving a user interaction 212, the account security management system 102 can determine a fraud risk score 218 corresponding to the user interaction 212. More specifically, the account security management system 102 can generate a fraud risk score 218 for a user interaction 212 by utilizing a fraud risk machine-learning model (e.g., the fraud risk machine-learning model 100). For instance, the account security management system 102 utilizes the fraud risk machine-learning model to process or analyze one or more features associated with the user interaction, client device, account, and/or transaction associated with the secure digital account. As illustrated, the fraud risk machine-learning model 100 can be a neural network, a series of gradient boosted trees, or other machine-learning models. Additional detail regarding training and utilizing a fraud risk machine-learning model is provided below (e.g., in relation to FIG. 3).

As further illustrated in FIG. 2, the account security management system 102 can perform an act 220 to assign a secure digital account into a security tier 222, 224, 226, 228. In particular, the account security management system 102 assigns the secure digital account to a security tier 222, 224, 226, 228 that corresponds to the calculated fraud risk score 218. As previously mentioned, different security tiers provide varying levels of protection. More specifically, each security tier designates which limitations the account security management system 102 applies to various account activities. For example, if the fraud risk score 218 indicates a high likelihood of a hacked account, the account security management system 102 places the secure digital account in the most restrictive complete lockout security tier 222. Once assigned to the complete lockout security tier, 222 the account security management system 102 completely locks out all client devices 214 from the secure digital account. More specifically, the account security management system 102 denies access to any information stored in secure digital account and prohibits all account activities associated with the secure digital account. As another illustration, if a fraud risk score 218 indicates a minor likelihood of fraudulent activity, the account security management system 102 may place the corresponding secure digital account in a less restrictive security tier. For example, in the partial lock out with limited access security tier 224, a client device 214 may have access to view account balances but may be prohibited from performing various account activities (e.g., virtual card transactions, fund transfers, fund withdrawals, etc.).

As mentioned above, the fraud risk score 218 associated with a user interaction 212 determines which security tier the account security management system 102 assigns to the secure digital account. In certain embodiments, if there is more than one device associated with the secure digital account assigned to a security tier, the account security management system 102 may apply different limitations to each associated device. Additional detail regarding assigning security tiers is provided below (e.g., in relation to FIGS. 4A-C).

Additionally, the account security management system 102 may request a step-up identity verification 230 to release a secure digital account from a security tier 222, 224, 226. More specifically, the account security management system 102 may request a personal identity verification from the client device 214 and compare the received personal identity information with stored information corresponding to the secure digital account. For example, the account security management system 102 may request personal identity verification by asking for a picture of a driver's license. Upon receiving an image of the driver's license, the account security management system may compare the information from the driver's license image (e.g., birthday, driver's license number, name, address etc.) with stored information corresponding to the secure digital account (e.g., birthday, account holder's name, address). In some embodiments, step-up identity verification may be biometric information. In other embodiments, the account security management system 102 may verify personal identity through images of personal information. For example, an image of a piece of mail with an individual's address may establish their identity. As another illustration, providing the last four digits of a user's social security number may verify their identity. Moreover, previously established account recovery passwords may authenticate one's identity. In certain embodiments, step-up verification may be text, image, or video data corroborating an authorized user's identity.

The account security management system 102 can perform additional acts based on a successful or unsuccessful step-up identification verification 230. For instance, as further illustrated in FIG. 2, if the received personal identity verification matches stored information corresponding to the secure digital account, the account security management system 102 may release the secure digital account from the assigned security tier. Thus, allowing a device unlimited access to the secure digital account and corresponding account activities. However, as further illustrated in FIG. 2, if the received personal identity verification does not match the stored information corresponding to the secure digital account, the account security management system 102 will not release the secure digital account from the security tier. In such instances, the account security management system 102 may request additional documentation to verify the identity of an account holder.

Figure 3:
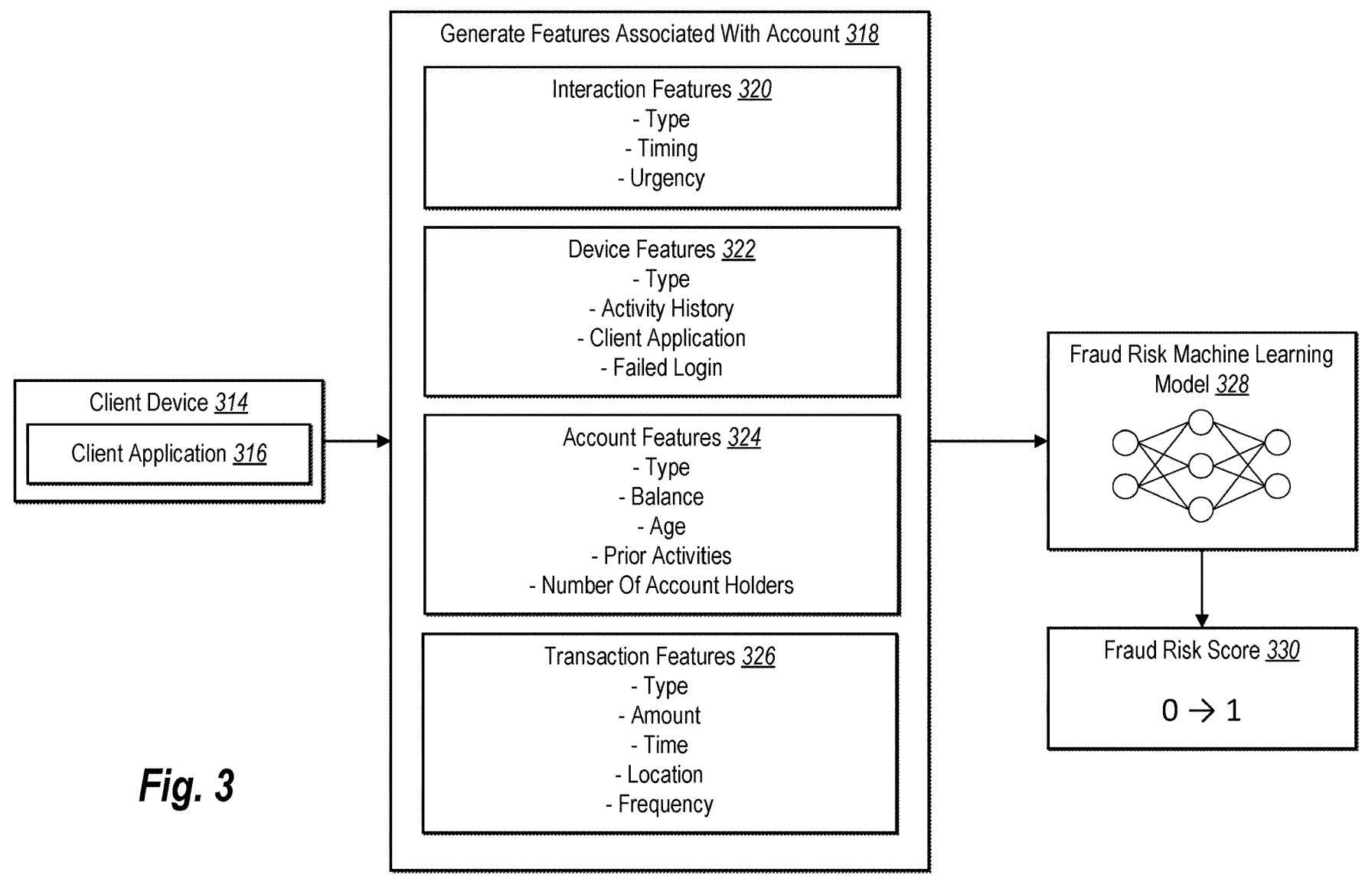

As mentioned above, in certain embodiments, the account security management system 102 utilizes a fraud risk machine-learning model 328 to generate a fraud risk score associated with a user interaction. In particular, FIG. 3 illustrates the account security management system 102 determining a fraud risk score in accordance with one or more embodiments. More specifically, FIG. 3 illustrates the account security management system 102 utilizing a fraud risk machine-learning model to determine a fraud risk score based on identified features associated with a user interaction.

As illustrated in FIG. 3, the account security management system 102 identifies features 318 associated with a user interaction. Some of the identified features could belong to one or more feature groups, such as features categorized as (i) an interaction feature 320, (ii) a device feature 322, (iii) an account feature 324, or (iv) a transaction feature 326. In addition to identifying feature groups, the account security management system 102 can also identify individual features, data, and/or information within each feature group. For example, an interaction feature group 320 could take into account individual features, such as the urgency, type, timing, source, and content associated with an interaction. For example, the account security management system 102 may receive an e-mail from an account holder claiming their secure digital account was hacked. Once the account security management system 102 receives the e-mail, it may identify interaction features such as, the contents of the e-mail, the sender, and the urgency associated with the user interaction. In other embodiments, the account security management system 102 may receive other indications of fraudulent activity. For instance, the account security management system may receive a phone call, video call, text message, in-app message, or secure online account message about a potential account takeover event. In certain embodiments, the account security management system 102 may identify interaction features via the client device 314, a web-based application, or the client device through the client application 316. In other embodiments, the account security management system 102 may receive an indication of a potential account take over via the client application or other machine-learning models identifying a hacked account.

A device feature group 322 can include individual features such as, type of device, age of device, device's operating system, corresponding IP addresses, connected Wi-Fi networks, location of the device, history of account activity associated with the device, presence of client application on the device, device's security parameters, number of failed login attempts, or number of successful login attempts. For instance, if the account security management system 102 receives an indication of a potential account takeover it may identify the age, type, operating system, and security level of client device(s) 314 associated with the secure digital account. In some embodiments, the account security management system 102, may have stored information about features of a specific client device associated with the secure digital account. For example, the account security management system 102 may store features regarding which devices download the client application 316, regularly access the account, and consistently perform account activities linked to the secure digital account. In other embodiments, the account security management system 102 can identify device features via the client application 316. In other instances, the account security management system 102 may identify device features via the client device 314 or web application.

An account feature group 324 may include individual features such as, account type, account passwords, account balances, age of account(s), number of account holders, number of corresponding accounts, number of associated devices, recent account activities, and prior account activities. For example, the account security management system 102 may identify recent account activities or transactions (e.g., changing passwords, transferring large sums of money, or draining account funds), account type (e.g., checking, credit card, savings, or money market), and age of the account as features to help generate a fraud risk score 330. In some embodiments, the account security management system 102 may identify an account feature 324 based on information received during a user interaction. In other embodiments, the account security management system 102 can identify account features via the client application 316, the client device 314, or a web-based application.

Like the previously mentioned feature groups, a transaction feature group 326 may also include individual features related to the transaction such as the type of transaction and/or account activity, the transaction amount for the activity, the transaction's timestamp, the transaction's location, the transaction's involved parties, or the frequency of the transaction and/or account activity. For instance, the account security management system 102 can identify features associated with a transaction that might signal a potential account take over event. In particular, the account security management system 102, may identify features surrounding suspicious or abnormal activity. For example, if a duplicitous user takes over a secure digital account and drains the secure digital account's funds, the account security management system 102 may identify the affected account, type of account, timestamp, and financial sum of the fraudulent activity. In some embodiments, the account security management system 102 may identify a transaction feature via the client device 314, the client application 316, or a web-based application.

As FIG. 3 further illustrates, after identifying group and individual features associated with the interaction, the account security management system 102 may utilize a fraud risk machine-learning model 328 to generate a fraud risk score 330. U.S. application Ser. No. 17/545,890 is incorporated by reference in its entirety and discloses an example of the account security management system 102 utilizing and training the fraud risk machine-learning model to generate a fraud risk score 330. For example, if the account security management system 102 receives a call from a user claiming their account was taken over by a devious hacker, the account security management system 102 can identify when and how the user reported the incident; which associated client device(s), if any, triggered the takeover event or were used during the takeover event; which accounts were affected by the account takeover; and the amount, timing, and type of fraudulent activities taken by the hacker.

As FIG. 3 further illustrates, upon identifying features associated with a user interaction, the account security management system 102 can utilize a fraud risk machine-learning model 328 to generate a fraud risk score 330. The account security management system 102 may use the fraud risk score 330 to determine a likelihood of fraudulent activity (e.g., an account takeover, a hacked account, unauthorized access, etc.) corresponding to a secure digital account. In some embodiments, the fraud risk score 330 can comprise a numerical score (e.g., a number, a fraction, or other numerical indicators) indicated a degree to which a fraud risk machine-learning model 328 predicts that user interaction signals fraudulent activity associated with the secure digital account. In other embodiments, the fraud risk score could be a classifier (e.g., a binary classification, such as a "0" or "1") indicating a prediction that a user interaction indicates a take-over event.

Figure 4A:
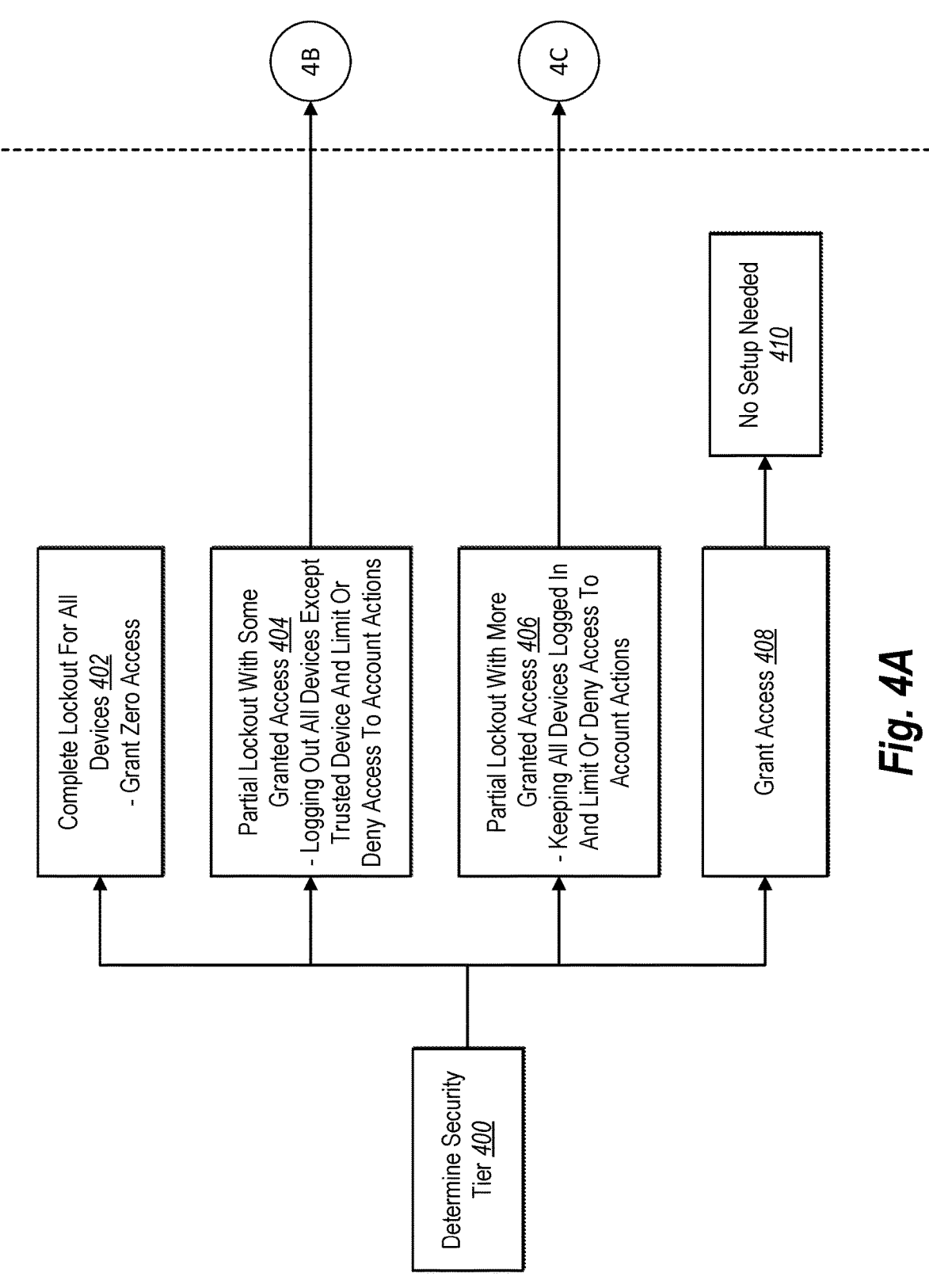
FIGS. 4A-4C illustrate example diagrams of varying access based on a security tier and device trust score in accordance with one or more embodiments.
Figure 4B:
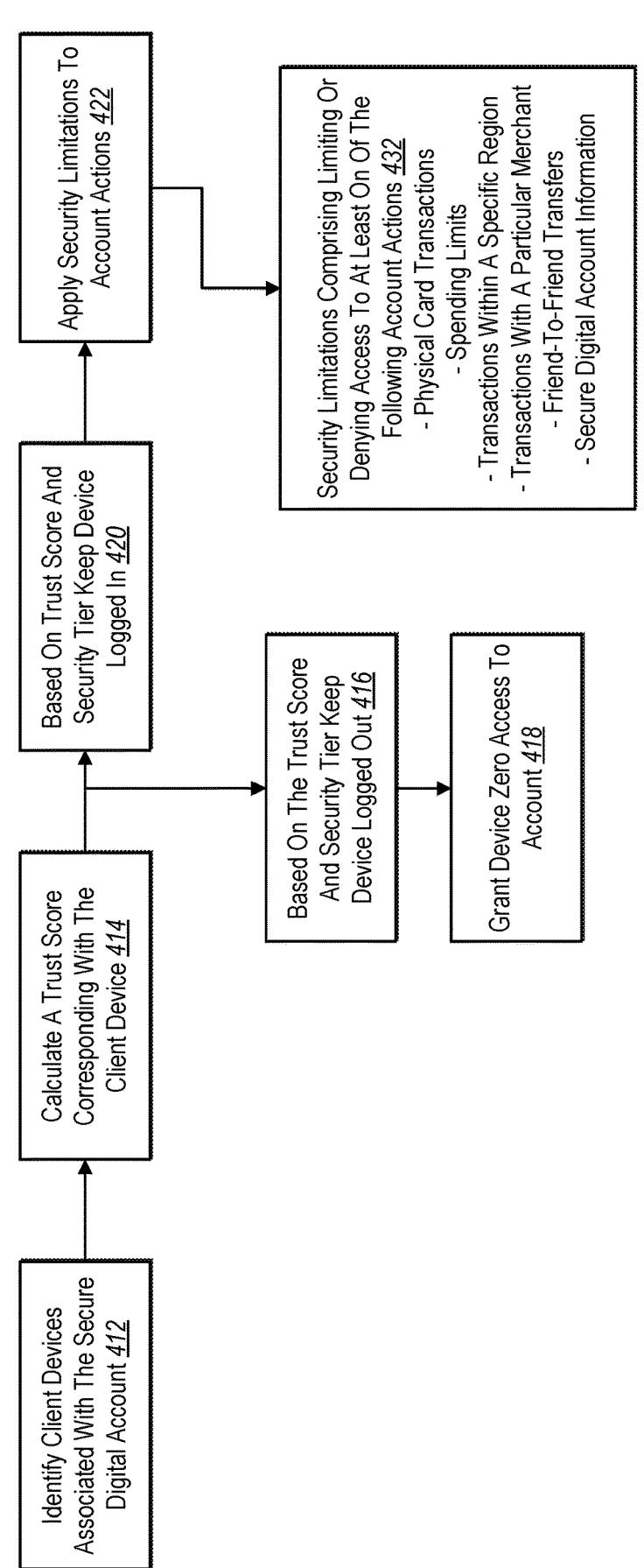
Figure 4C:
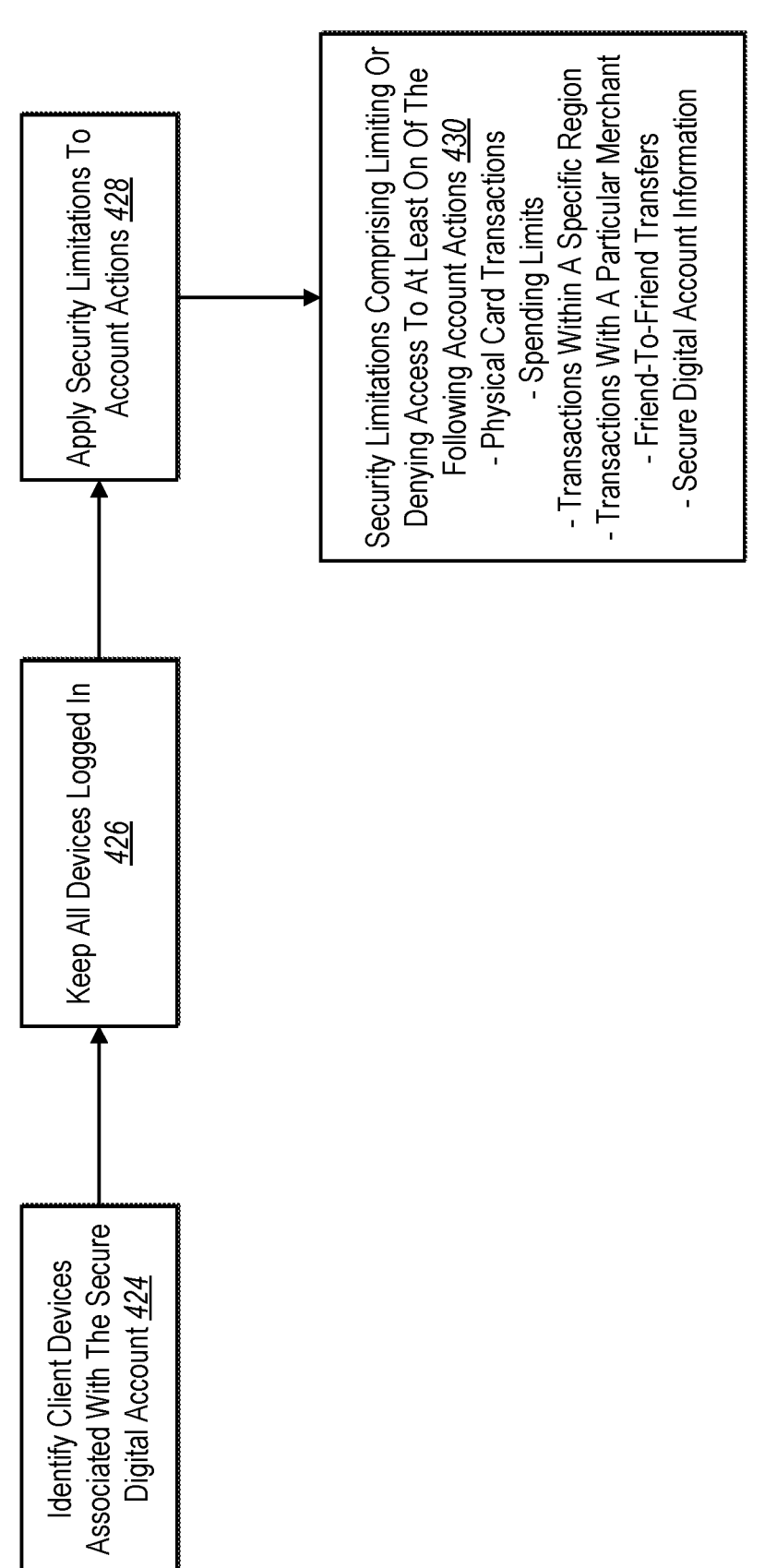

As further illustrated in FIGS. 4A-4C, the account security management system 102 can assign a potentially compromised secure digital account into a security tier based on the fraud risk score 330. In fact, the account security management system 102 can determine that the fraud risk score 330 corresponds to a security tier by determining if the fraud risk score falls within a specific range (e.g., above 0.90, between 0.70-0.90, or below 0.70) or if a decision tree answers "yes" to questions regarding whether there is a risk that the user interaction indicates that a secure digital account is experiencing a hack and/or account take-over event. As further shown in FIG. 4A, the account security management system 102 can determine that the fraud risk score does not indicate fraudulent activity and grant access to client devices without step-up identification verification 410.

As previously mentioned, in some embodiments, when the fraud risk score falls outside of ranges that indicate an account take-over or other fraudulent activity, the account security management system 102 may grant full access to the secure digital account and related account activities. For example, the account security management system 102 may allow the associated client device(s) access to sensitive information (e.g., date of birth, account numbers, credit card numbers, logins, passwords, etc.). In other embodiments, the account security management system 102 may allow the client device(s) to perform all account activities corresponding to the secure digital account. For instance, account activities may include, virtual card purchases, transfers, changing login credentials, and/or transaction review.

As shown in FIG. 4A, the account security management system 102 can prohibit or limit access to the secure digital account based on the security tier. For instance, based on a user interaction with a fraud risk score signaling a high likelihood of an account take-over event, the account security management system 102 can assign the secure digital account corresponding to the user interaction to the most restrictive security tier. Indeed, the account security management system 102 may prohibit any device from accessing sensitive account information or account activities associated with secure digital accounts assigned to the complete lockout security tier 402. More specifically, the account security management system 102 may log out all devices from the secure digital account and prevent them from utilizing any actions associated with the secure digital account. For example, the account security management system 102 may prevent client devices from performing virtual card transactions, physical card transactions, or viewing information corresponding to the secure digital account. In some embodiments, the account security management system 102 may provide a prompt or notification indicating that the client device has zero access to the account, account information and/or account actions.

As further illustrated in FIG. 4A, the account security management system 102 may assign, based on the fraud risk score, a secure digital account to a security tier that partially locks out some devices while granting certain devices limited access to sensitive information and account actions. For instance, the account security management system 102 may keep certain client devices that meets a trust score threshold logged into the account while logging out other devices. For example, the account security management system 102 may grant a cellular device access to the secure digital account while denying a tablet access to the secure digital account because the cellular device meets or surpasses a trust score threshold and the table does not. In the case that the account security management system 102 grants a specific device access to the secure digital account, the account security management system 102 may limit the granted device access to specific account actions. For instance, if the account security management system 102 grants a cellular device access to the secure digital account, the cellular device may not be able to perform virtual card purchases or fund transfers, but may have access to see account balances and recent transactions. In other embodiments, the account security management system 102 may keep a device logged in and allow only physical card transactions and purchases up to a specific amount. Additional description regarding trust scores and devices accessing limited account information and actions associated with a secure digital account is provided with respect to FIG. 4B below.

As further shown in FIG. 4A, the account security management system 102 may assign a secure digital account to a security tier that partially locks out client devices while granting more access to account features. More specifically, the account security management system 102 does not log out any devices associated with a secure digital account assigned to a partial lockout security tier with more granted access 406. In fact, the account security management system 102 keeps all of the devices logged in to secure digital account via the client application. In some embodiments, the account security management system 102 may limit account actions on all logged in client devices. For instance, all client devices associated with the secure digital account may transfer money with familiar or connected accounts while having zero access to virtual card transactions. In other embodiments, client devices associated with the secure digital account may have access to recent transactions and account balances while having zero access to sensitive account holder information (e.g., login credentials, passwords, address). Additional description regarding limited access to account actions is provided with respect to FIG. 4C below.

As mentioned above and further illustrated in FIG. 4A, the account security management system 102 may assign a security tier that grants all devices associated with the secure digital account full access 408 to the secure digital account and account actions. More specifically, when the fraud risk score falls within a specified range indicating zero to marginal likelihood of fraudulent activity (e.g., account take-over, hacked account, fraudulent fund transfer, etc.) associated with a use interaction, the account security management system 102 grants any client device connected to the secure digital account unlimited access to sensitive information and account actions. In fact, under the security tier granting access 408 a client device does not need to verify their identity through a step-up verification process. For example, if the account security management system 102 receives a fraud risk score associated with a user interaction signaling no likelihood of an account takeover event, the account security management system 102 may keep the client device logged into the client application 116 and provide full access to account actions (e.g., virtual card transactions, fund transfers, changing passwords). In some embodiments, the account security management system 102 may notify a client device that they still have full access to the secure digital account and account actions after receiving a user indication. In other embodiments, the client device may not provide any notification but may continue operating as if the account security management system 102 never received a user interaction signaling a possible account takeover event.

As previously mentioned, certain devices may access secure digital accounts assigned to a partial lockout with some devices granted access security tier 404. FIG. 4B illustrates devices accessing a secure digital account placed in a partial lockout tier with some granted access 404. For instance, after assigning a secure digital account to a partial lockout security tier 404, the account security management system 102 may identify client devices associated with the secure digital account 412. For instance, the account security management system 102 may have a unique identification number for each device associated with the secure digital account. In some embodiments, the account security management system 102 may recognize a device based on historical login information. In other cases, the account security management system 102 may identify a device by recognizing a device's IP number, Wi-Fi network, or geographical location. Additionally, the account security management system 102 may receive identifying information via an accessing client device. In other embodiments, the account security management system 102 may receive identifying information via the accessing client device through a client application.

As further shown in FIG. 4B, once the account security management system 102 identifies devices associated with the secure digital account, the account security management system 102 can calculate a trust score 414 corresponding with a client device. A trust score is an indication that a client device is authorized to securely and safely access a secure digital account. For instance, the account security management system 102 may calculate a trust score based on the client device's features. For example, a trust score may be based on the client device's transaction history, login history, strength of login credentials, fraudulent activity history, client application activity history, the client device's location, or the device's security system. For instance, the trust score may be based on determining whether the client device passed a previous scan identification event. In other cases, the trust score may be based on identifying the client device as the initial enrollment device associated with the secure digital account. In other embodiments, the account security management system 102 may receive information and/or data regarding a device's feature via the device. In some embodiments, the account security management system 102 may receive the device's features via the device through the client application 116.

FIG. 4B further illustrates, granting a device access to a secure digital account based on its trust score meeting a specified threshold. More specifically, the account security management system 102 can determine that the trust score does not satisfy a trust score threshold. For example, the account security management system 102 can determine that the trust score falls below a trust score threshold by determining if the trust score is below a certain numerical threshold (e.g., above 0.90) or if a decision tree answers "yes" to questions regarding whether there is a risk that the device accessing the secure digital account is linked to an account take-over event. For instance, if a device's trust score falls below a specified threshold, the account security management system 102 logs the device out of the client application 416 and denies access to the secure digital account 418 and corresponding account activities.

In other embodiments, when the trust score does meet the trust score threshold, the account security management system 102 keeps the device logged into the secure digital account. As indicated above, the account security management system 102 can apply security limitations to account actions 422 on a device with a trust score that satisfies a trust score threshold. To illustrate, the account security management system 102 may deny access to secure digital account information. In other embodiments, the account security management system 102 may place spending limits on purchases or only allow purchases within a specific geographic region. In certain cases, the account security management system 102 may place varying limitations on devices surpassing the trust score threshold.

Additionally, in some embodiments, the account security management system 102 may include notifications indicating which account actions are available or prohibited. For instance, the account security management system 102 may highlight which account actions the client device may take. In other embodiments, the account security management system 102 may provide a list of prohibited or limited activities.

As mentioned above, based on the assigned security tier partially locking out devices while granting more access 406 to devices associated with the secure digital account, the account security management system 102 may keep all devices logged into the account while limiting or denying access to certain account actions. FIG. 4C further illustrates the account security management system 102, partially locking out devices while granting more access.

For instance, as illustrated in FIG. 4C, the account security management system 102, may identify all client devices associated with the secure digital account. A device associated with the secure digital account is any computing device that has accessed information within a secure digital account and/or initiated and/or performed account activities connected to the secure digital account. For instance, the account security management system 102 may identify an associated client device by recognizing a unique device identification number. In other embodiments, the account security management system 102 may recognize a device based on historical login information. In some cases, the account security management system 102 may identify a device by recognizing a device's IP number, Wi-Fi network, and/or geographical location. In some embodiments, the account security management system 102 may receive identifying information via an accessing client device. In other embodiments, the account security management system 102 receives identifying information via the accessing client device through a client application.

As FIG. 4C further illustrates, once the account security management system 102 identifies client devices associated with the secure digital account, the account security management system 102 keeps all devices associated with the secure digital account logged into the secure digital account 426. Indeed, the account security management system 102 allows all associated devices to access limited account information on the secure digital account and perform limited account actions.

As previously stated, the account security management system 102 allows associated devices limited access to the corresponding secure digital account. In some instances, the account security management system 102 may allow devices to see recent transactions or make purchases with a particular merchant while prohibiting associated devices from making virtual card transactions. In certain embodiments, the account security management system 102 may place differing limitations on different individual devices associated with the same secure digital account.

Figure 5:
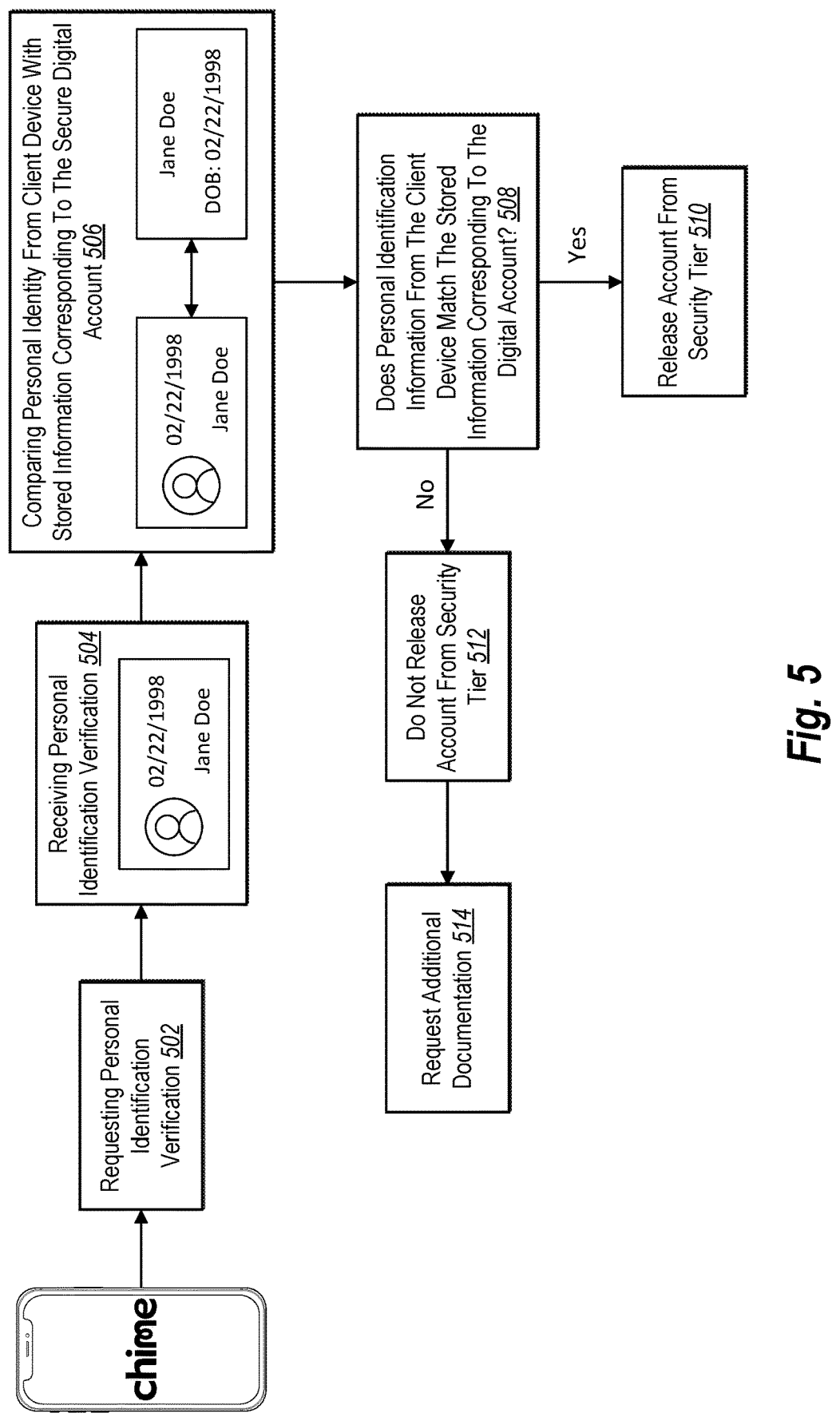
FIG. 5 illustrates an example flowchart for verifying a personal identity from a client device in accordance with one or more embodiments.

As mentioned above, when a secure digital account suffers a legitimate account takeover event or faces a high likelihood of experiencing a hack, the account security management system 102 protects the secure digital account by placing the secure digital account into a security tier and applying security limitations on the secure digital account. Once the account security management system 102 protects the secure digital account, the account security management system 102 may release the secure digital account from the assigned security tier and remove the security limitations. In fact, the account security management system 102 may help an authorized user regain access to their secure digital account through a step-up verification process. FIG. 5 illustrates the account security management system 102 removing the security limitations and releasing a secure digital account from the assigned security tier by demonstrating an embodiment of the step-up identification verification.

As illustrated in FIG. 5, the account security management system 102 requests a personal identity verification 502 from the client device associated with the secure digital account. A personal identity verification authenticates a user's identity through their client device by requesting personal identity information about the user. Personal identity information is data, material, or evidence that correctly names and/or establishes an individual's identity. Forms of personal identity information may include, but are not limited to, a user's full legal name, age, date of birth, gender, DNA, fingerprints, facial scans, retinal scans, address, social security number, tax identification number, cellphone number, email address, driver's license number, passport number, state issued ID number, debit/credit card information, account login credentials.

As FIG. 5 illustrates, the account security management system 102 may request an image, video, biometric, and/or text data containing information corroborating a user's identity. For example, the account security management system 102 may request an image of a form of identification (e.g., driver's license, state ID, social security card, birth certificate, military ID, valid passport, etc.). In other embodiments, the account security management system may request biometric data (e.g., fingerprint scan, retinal scan, facial recognition scan, vocal patterns, etc.) to authenticate an individual's identity. In other embodiments, the account security management system may confirm a user's identity through geographic location and verified home address.

Along with requesting personal information documentation, the account security management system 102 may provide a graphical use interface requesting a liveness check to verify that an authorized user is presently and actively authenticating their identity. In fact, the liveness check may be passive or active. For instance, a passive liveness check verifies a user's presence without the user being aware that it is occurring. More specifically, a passive liveness check detects specific features such as edges, depth and texture to distinguish a live human face from an inanimate face. For example, while a user confirms a picture of a scanned ID, the device may run a passive liveliness check in the background. In other instances, the account security management system 102 may provide a graphical user interface requesting an active liveness check by asking the user to perform a specific task. For example, upon requesting an image of an identification document, the account security management system 102 may provide a graphical user interface requesting the user to take a selfie. In other embodiments, the account security management system 102 may request the user to perform other tasks (e.g., asking user to blink, make a hand gesture, nod, smile, etc.). In certain embodiments, the account security management system 102 may provide graphical user interfaces that perform passive and active liveness checks at the same time.

As FIG. 5 further illustrates, the account security management system 102 can receive a personal identity verification 504. For instance, the account security management system 102 can receive an image, video, and/or text data of an identification document as the user's personal identity verification. In other embodiments, the account security management system 102 may receive biometric data as a user's personal identity verification. For instance, the account security management system 102 may receive a user's fingerprints and/or the user's retinal scan. Additionally, the account security management system 102 may receive a personal identity verification via the client device. In other embodiments, the account security management system 102 may receive the personal identity verification via the client device through the client application. In some cases, the account security management system 102 may receive a personal identity verification from a web-based application.

Upon receiving the personal identity verification 504, the account security management system 102 can compare the received personal identity information with stored information corresponding to the secure digital account 506. Moreover, the account security management system 102 can store information about a secure digital account and its account users. For instance, the account security management system 102 can store the following information for authorized users of a secure digital account: legal name, previously used names, addresses, taxpayer identification number, social security number, cellphone number, date of birth, driver's license number, passport number, account information, debit/credit card information, beneficiary information, login credentials, passwords, biometric data (e.g., DNA, finger print, retinal scan, facial recognition), and/or pre-approved recovery passwords.

As previously mentioned, the account security management system 102 may compare information from a received personal identity verification request 504 with stored information corresponding to a secure digital account 506. For instance, if the account security management system 102 receives an image of a user's driver's license, it can compare the user's name, date of birth, and address on the driver's license with the stored name, date of birth and address corresponding to the authorized user of the secure digital account. In other embodiments, the account security management system may receive a retinal scan from a user and compare it with a stored retinal scan of the user corresponding to the secure digital account.

Once the account security management system 102 compares the received personal identity verification data with stored information corresponding to the secure digital account, the account security management system 102 can determine if the received information matches the stored information 508. For instance, as FIG. 5 further illustrates, if the account security management system 102 determines that the personal identity information from the client device matches the stored information corresponding to the digital account, the account security management system 102 releases the secure digital account from the assigned security tier 510. For example, if the account security management system receives an image of a user's passport and the name, picture, address, and date of birth is the same as stored information corresponding to the secure digital account, the account security management system 102 can release the secure account from the security tier.

As shown in FIG. 5, if the account security management system 102 determines that the received personal identity information does not match stored information corresponding to the secure digital account, the account security management system 102 will not release the secure digital account from the security tier. For example, if the name on a user's driver's license does not match any stored names corresponding to the secure digital account, the account security management system 102 can keep the secure digital account in the assigned security tier 512.

As FIG. 5 further illustrates, if the account security management system 102 does not release the secure digital account from the security tier, the account security management system may request additional documentation to verify a user's identity. For instance, the account security management system 102, may request previously issued bank statements or other documents certifying an individual's identity.

Figure 6:
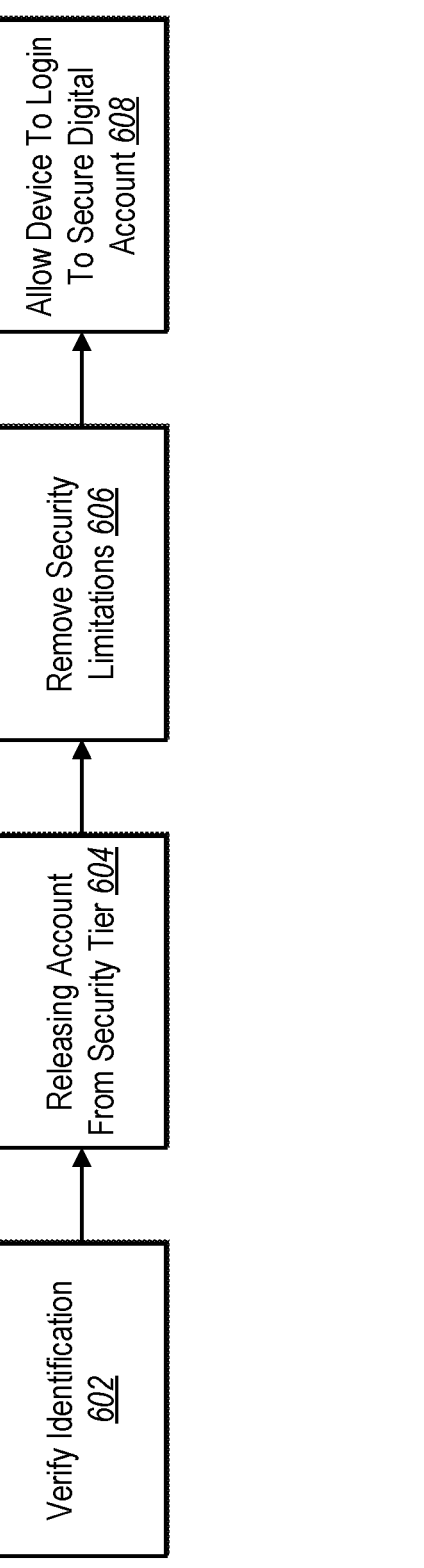
FIG. 6 illustrates an example diagram of removing security limitations from a secure digital account in accordance with one or more embodiments.

As illustrated in FIG. 6 and mentioned above, the account security management system 102 may verify a user's identity 602 and release the secure digital account from a security tier 604. Upon releasing the secure digital account from the security tier, the account security management system 102 may remove any applied security limitations 606. For instance, if a secure digital account is placed in the complete lockout security tier that logs out a client device, prevents the client device from accessing the secure digital account, and prohibits the client device and user from performing any account actions linked to the secure digital account, the account security management system 102 may remove those restrictions. In fact, as further illustrated in FIG. 6, the account security management system may remove the restrictions and allow the client device to log in to the secure digital account. Indeed, the account security management system 102, may allow the client device to access all information related to the secure digital account (e.g., account credentials, account balances, previous transactions, etc.) and perform any account actions (e.g., account transfers, purchases, withdrawals, etc.). In some embodiments, if the account security management system 102 allows a device to log in to a previously compromised secure digital account, the account security management system 102 can provide a graphical user interface requesting that the user change their login name and/or password.

In some embodiments, after a client device logs into a secure digital account, the account security management system 102 may provide a graphical user interface displaying transactions associated with the secure digital account. In some embodiments, the account security management system 102 may provide filter options (e.g., recent transactions, type of transaction, value amount, etc.) that allows a user to efficiently review account actions associated with the secure digital account. For instance, a user may filter their transaction by showing account activities that occurred during the previous 24 hours. In other embodiments, a user may filter transactions that surpass a specified monetary amount.

The graphical user interface may further comprise of selectable transaction options. More specifically, the graphical user interface may comprise of a selectable dispute transaction option and/or a selectable confirm transaction option. For instance, a user may select a dispute transaction option when they did not authorize, initiate, or perform a specific purchase, fund transfer, and/or fund withdrawal. Once a user selects the dispute transaction option, the account security management system 102 can receive the user's selection and confirm whether the disputed transaction is fraudulent or authentic. In other embodiments, the user may select a confirm transaction option when they authorized, initiated, or performed a specific transaction. For instance, if the user initiated a friend-to-friend transfer just before an account take over event, the user may confirm that they performed the friend-to-friend transfer.

FIG. 7, the corresponding text, and the examples provide a number of different methods, systems, devices, and non-transitory computer-readable media of the account security management system 102. In addition to the foregoing, one or more embodiments can also be described in terms of flow-charts comprising acts for accomplishing a particular result, as shown in FIG. 7. FIG. 7 may be performed with more or fewer acts. Further, the acts may be performed in differing orders. Additionally, the acts described herein may be repeated or performed in parallel with one another or parallel with different instances of the same or similar acts.

As mentioned, FIG. 7 illustrates a flowchart of a series of acts 700 for an account security management system 102 in accordance with one or more embodiments. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer-readable medium can comprise instructions that, when executed by one or more processors, cause a computing device to perform the acts of FIG. 7. In some embodiments, a system can perform the acts of FIG. 7.

FIG. 7 illustrates an example series of acts 700 for utilizing a fraud risk machine-learning model to determine a fraud score corresponding to a user interaction associated with a secure digital account and utilizing the fraud score to place a secure digital account into a security tier and utilizing a personal identity verification to release a secure digital account from a security tier. As shown in FIG. 7, the series of acts 700 can include an act 702 of receiving a user interaction associated with a secure digital account.

Further, the series of acts 700 includes an act 704 of determining a fraud risk score corresponding to the user interaction. In particular, the act 704 involves generating, utilizing a fraud risk machine-learning model, a fraud risk score based on one or more features associated with a user interaction.

In addition, as illustrated in FIG. 7, the series of acts 700 includes an act 706 of assigning the secure digital account into a security tier. Moreover, the series of acts 700 includes an act 708 of applying security limitations to the secure digital account. In particular, the act 708 involves denying or limiting access to account actions. Furthermore, the series of acts 700 includes an act 710 of requesting a personal identity verification. In particular, the act 710 involves requesting personal identity information. Additionally, the series of acts 700 includes an act 712 of receiving a personal identity verification. In particular, the act 712 involves receiving personal identity information authenticating a user's identity. Furthermore, the series of acts 700 includes an act 714 of comparing a personal identity verification with stored information. In particular, act 714 involves determining whether the received personal identity information matches stored information corresponding to the secure digital account. Moreover, the series of acts 700 includes an act 716 of releasing the secure digital account from a security tier. In particular, the act 716 involves removing security limitation from the secure digital account.

Furthermore, the series of acts 700 includes calculating a trust score corresponding with the client device and based on the trust score and the security tier, keeping the client device logged in while applying security limitations to account actions, calculating an additional trust score corresponding with an additional client device associated with the secure digital account and based on the additional trust score and the security tier, logging out the additional client device associated with the secure digital account.

Additionally, the series of acts 700 includes applying security limitations to the secure digital account comprises limiting or denying access to at least one of the following account actions: physical card transactions, virtual card transactions, spending, withdrawal amounts, transactions within a geographic region, transactions with a particular merchant, friend-to-friend transfers, or secure digital account information.

Moreover, the series of acts 700 includes the user interaction associated with the secure digital account is based on receiving an indication of a suspected fraudulent account activity. In some embodiments, the series of acts 700 includes receiving the personal identity verification from the client device associated with the secure digital account by receiving an image of an identification document.

In other embodiments, the series of acts 700 includes logging out the client device associated with the secure digital account based on applying the security limitations and logging in the client device associated with the secure digital account based on releasing the secure digital account from the security tier by removing the security limitations. In other cases, the series of acts 700 includes based on the security tier, providing, to the client device, a graphical user interface displaying transactions associated with the secure digital account, wherein the graphical user interface comprises selectable options to dispute or confirm the transactions associated with the secure digital account, and receiving, from the client device, and indication of a user selection of a selectable option to dispute a transaction.

In some embodiments, the series of acts 700 includes an act of based on releasing the secure digital account from the security tier, prompting the client device to change a password associated with the secure digital account. Moreover, the series of acts 700 includes assigning the associated trust score further by determining whether the client device passed a previous scan identification event, or identifying the client device as an initial enrollment device associated with the secure digital account.

Furthermore, the series of acts 700 includes identifying one or more features associated with the user interaction and utilizing a fraud risk machine-learning model to determine the fraud risk score based on the one or more features. Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 8:
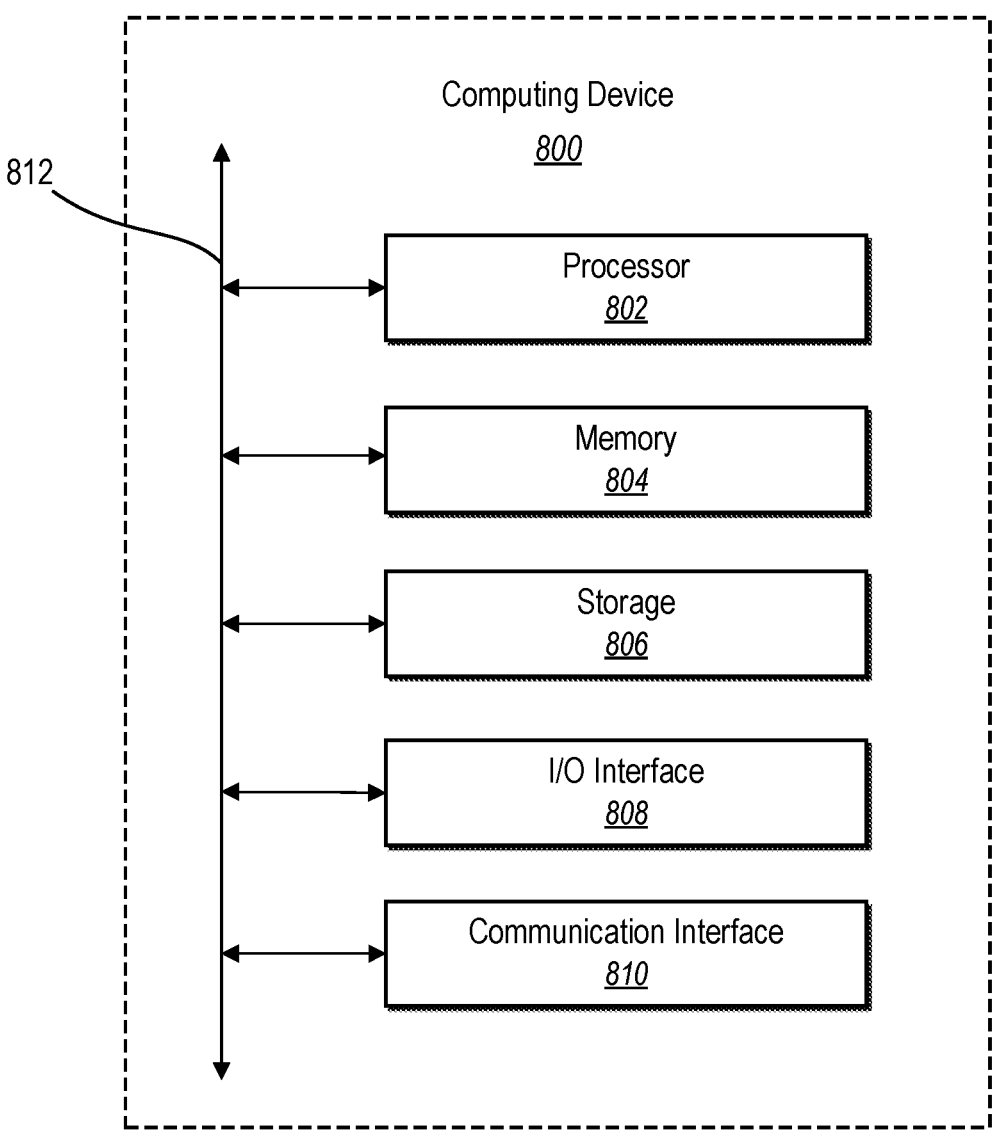
FIG. 8 illustrates a block diagram of a computing device for implementing one or more embodiments of the present disclosure.

FIG. 8 illustrates a block diagram of an example computing device 800 that may be configured to perform one or more of the processes described above. One will appreciate that one or more computing devices, such as the computing device 800 may represent the computing devices described above (e.g., the server(s) 106, the client device 112*a*, and the network 118). In one or more embodiments, the computing device 800 may be a mobile device (e.g., a mobile telephone, a smartphone, a PDA, a tablet, a laptop, a camera, a tracker, a watch, a wearable device, etc.). In some embodiments, the computing device 800 may be a non-mobile device (e.g., a desktop computer or another type of client device). Further, the computing device 800 may be a server device that includes cloud-based processing and storage capabilities.

As shown in FIG. 8, the computing device 800 can include one or more processor(s) 802, memory 804, a storage device 806, input/output interfaces 808 (or "I/O interfaces 808"), and a communication interface 810, which may be communicatively coupled by way of a communication infrastructure (e.g., bus 812). While the computing device 800 is shown in FIG. 8, the components illustrated in FIG. 8 are not intended to be limiting. Additional or alternative components may be used in other embodiments. Furthermore, in certain embodiments, the computing device 800 includes fewer components than those shown in FIG. 8. Components of the computing device 800 shown in FIG. 8 will now be described in additional detail.

In particular embodiments, the processor(s) 802 includes hardware for executing instructions, such as those making up a computer program. As an example, and not by way of limitation, to execute instructions, the processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 804 may be internal or distributed memory.

The computing device 800 includes a storage device 806 includes storage for storing data or instructions. As an example, and not by way of limitation, the storage device 806 can include a non-transitory storage medium described above. The storage device 806 may include a hard disk drive (HDD), flash memory, a Universal Serial Bus (USB) drive or a combination these or other storage devices.

As shown, the computing device 800 includes one or more I/O interfaces 808, which are provided to allow a user to provide input to (such as user strokes), receive output from, and otherwise transfer data to and from the computing device 800. These I/O interfaces 808 may include a mouse, keypad or a keyboard, a touch screen, camera, optical scanner, network interface, modem, other known I/O devices or a combination of such I/O interfaces 808. The touch screen may be activated with a stylus or a finger.

The I/O interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 808 are configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 provides one or more interfaces for communication (such as, for example, packet-based communication) between the computing device and one or more other computing devices or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can include hardware, software, or both that connects components of computing device 800 to each other.

Figure 9:
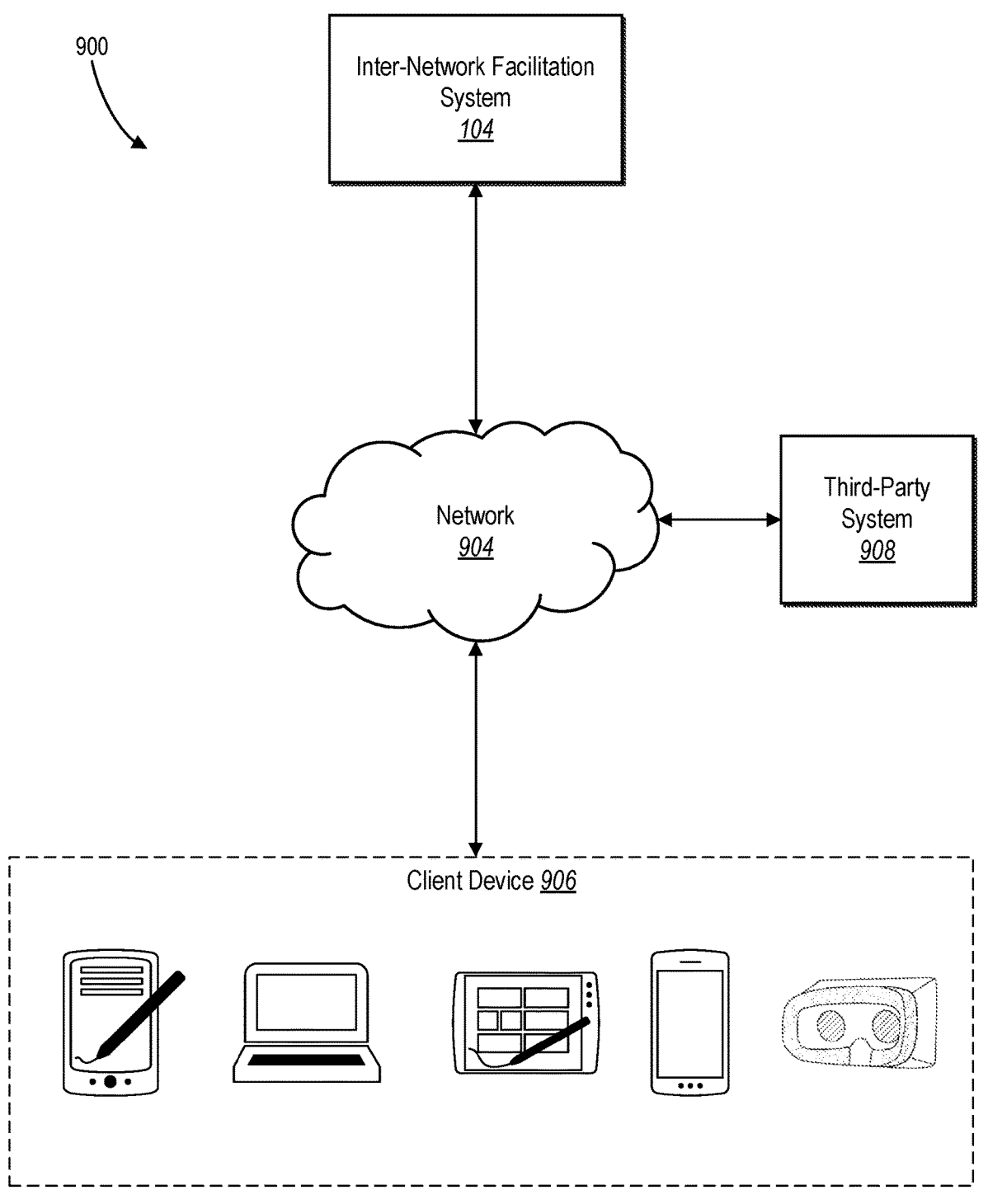
FIG. 9 illustrates an example environment for an inter-network facilitation system in accordance with one or more embodiments.

FIG. 9 illustrates an example network environment 900 of the inter-network facilitation system 104. The network environment 900 includes a client device 906 (e.g., client device 110a-110n), an inter-network facilitation system 104, and a third-party system 908 connected to each other by a network 904. Although FIG. 9 illustrates a particular arrangement of the client device 906, the inter-network facilitation system 104, the third-party system 908, and the network 904, this disclosure contemplates any suitable arrangement of client device 906, the inter-network facilitation system 104, the third-party system 908, and the network 904. As an example, and not by way of limitation, two or more of client device 906, the inter-network facilitation system 104, and the third-party system 908 communicate directly, bypassing network 904. As another example, two or more of client device 906, the inter-network facilitation system 104, and the third-party system 908 may be physically or logically co-located with each other in whole or in part.

Moreover, although FIG. 9 illustrates a particular number of client devices 906, inter-network facilitation systems 104, third-party systems 908, and networks 904, this disclosure contemplates any suitable number of client devices 906, inter-network facilitation system 104, third-party systems 908, and networks 904. As an example, and not by way of limitation, network environment 900 may include multiple client device 906, inter-network facilitation system 104, third-party systems 908, and/or networks 904.

This disclosure contemplates any suitable network 904. As an example, and not by way of limitation, one or more portions of network 904 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 904 may include one or more networks 904.

Links may connect client device 906, account security management system 102, and third-party system 908 to network 904 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 900. One or more first links may differ in one or more respects from one or more second links.

In particular embodiments, the client device 906 may be an electronic device including hardware, software, or embedded logic components or a combination of two or more such components and capable of carrying out the appropriate functionalities implemented or supported by client device 906. As an example, and not by way of limitation, a client device 906 may include any of the computing devices discussed above in relation to FIG. 11. A client device 906 may enable a network user at the client device 906 to access network 904. A client device 906 may enable its user to communicate with other users at other client devices 906.

In particular embodiments, the client device 906 may include a requester application or a web browser, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user at the client device 906 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 906 one or more Hyper Text Markup Language ("HTML") files responsive to the HTTP request. The client device 906 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, inter-network facilitation system 104 may be a network-addressable computing system that can interface between two or more computing networks or servers associated with different entities such as financial institutions (e.g., banks, credit processing systems, ATM systems, or others). In particular, the inter-network facilitation system 104 can send and receive network communications (e.g., via the network 904) to link the third-party-system 908. For example, the inter-network facilitation system 104 may receive authentication credentials from a user to link a third-party system 908 such as an online bank account, credit account, debit account, or other financial account to a user account within the inter-network facilitation system 104. The inter-network facilitation system 104 can subsequently communicate with the third-party system 908 to detect or identify balances, transactions, withdrawal, transfers, deposits, credits, debits, or other transaction types associated with the third-party system 908. The inter-network facilitation system 104 can further provide the aforementioned or other financial information associated with the third-party system 908 for display via the client device 906. In some cases, the inter-network facilitation system 104 links more than one third-party system 908, receiving account information for accounts associated with each respective third-party system 908 and performing operations or transactions between the different systems via authorized network connections.

In particular embodiments, the inter-network facilitation system 104 may interface between an online banking system and a credit processing system via the network 904. For example, the inter-network facilitation system 104 can provide access to a bank account of a third-party system 908 and linked to a user account within the inter-network facilitation system 104. Indeed, the inter-network facilitation system 104 can facilitate access to, and transactions to and from, the bank account of the third-party system 908 via a client application of the inter-network facilitation system 104 on the client device 906. The inter-network facilitation system 104 can also communicate with a credit processing system, an ATM system, and/or other financial systems (e.g., via the network 904) to authorize and process credit charges to a credit account, perform ATM transactions, perform transfers (or other transactions) across accounts of different third-party systems 908, and to present corresponding information via the client device 906.

In particular embodiments, the inter-network facilitation system 104 includes a model for approving or denying transactions. For example, the inter-network facilitation system 104 includes a transaction approval machine-learning model that is trained based on training data such as user account information (e.g., name, age, location, and/or income), account information (e.g., current balance, average balance, maximum balance, and/or minimum balance), credit usage, and/or other transaction history. Based on one or more of these data (from the inter-network facilitation system 104 and/or one or more third-party systems 908), the inter-network facilitation system 104 can utilize the transaction approval machine-learning model to generate a prediction (e.g., a percentage likelihood) of approval or denial of a transaction (e.g., a withdrawal, a transfer, or a purchase) across one or more networked systems.

The inter-network facilitation system 104 may be accessed by the other components of network environment 900 either directly or via network 904. In particular embodiments, the inter-network facilitation system 104 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the inter-network facilitation system 104 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 906, or an inter-network facilitation system 104 to manage, retrieve, modify, add, or delete, the information stored in data store.

In particular embodiments, the inter-network facilitation system 104 may provide users with the ability to take actions on various types of items or objects, supported by the inter-network facilitation system 104. As an example, and not by way of limitation, the items and objects may include financial institution networks for banking, credit processing, or other transactions, to which users of the inter-network facilitation system 104 may belong, computer-based applications that a user may use, transactions, interactions that a user may perform, or other suitable items or objects. A user may interact with anything that is capable of being represented in the inter-network facilitation system 104 or by an external system of a third-party system, which is separate from inter-network facilitation system 104 and coupled to the inter-network facilitation system 104 via a network 904.

In particular embodiments, the inter-network facilitation system 104 may be capable of linking a variety of entities. As an example, and not by way of limitation, the inter-network facilitation system 104 may enable users to interact with each other or other entities, or to allow users to interact with these entities through an application programming interfaces ("API") or other communication channels.

In particular embodiments, the inter-network facilitation system 104 may include a variety of servers, sub-systems, programs, modules, logs, and data stores. In particular embodiments, the inter-network facilitation system 104 may include one or more of the following: a web server, action logger, API-request server, transaction engine, cross-institution network interface manager, notification controller, action log, third-party-content-object-exposure log, inference module, authorization/privacy server, search module, user-interface module, user-profile (e.g., provider profile or requester profile) store, connection store, third-party content store, or location store. The inter-network facilitation system 104 may also include suitable components such as network interfaces, security mechanisms, load balancers, failover servers, management-and-network-operations consoles, other suitable components, or any suitable combination thereof. In particular embodiments, the inter-network facilitation system 104 may include one or more user-profile stores for storing user profiles for transportation providers and/or transportation requesters. A user profile may include, for example, biographic information, demographic information, financial information, behavioral information, social information, or other types of descriptive information, such as interests, affinities, or location.

The web server may include a mail server or other messaging functionality for receiving and routing messages between the inter-network facilitation system 104 and one or more client devices 906. An action logger may be used to receive communications from a web server about a user's actions on or off the inter-network facilitation system 104. In conjunction with the action log, a third-party-content-object log may be maintained of user exposures to third-party-content objects. A notification controller may provide information regarding content objects to a client device 906. Information may be pushed to a client device 906 as notifications, or information may be pulled from client device 906 responsive to a request received from client device 906. Authorization servers may be used to enforce one or more privacy settings of the users of the inter-network facilitation system 104. A privacy setting of a user determines how particular information associated with a user can be shared. The authorization server may allow users to opt in to or opt out of having their actions logged by the inter-network facilitation system 104 or shared with other systems, such as, for example, by setting appropriate privacy settings. Third-party-content-object stores may be used to store content objects received from third parties. Location stores may be used for storing location information received from client devices 906 associated with users.

In addition, the third-party system 908 can include one or more computing devices, servers, or sub-networks associated with internet banks, central banks, commercial banks, retail banks, credit processors, credit issuers, ATM systems, credit unions, loan associates, brokerage firms, linked to the inter-network facilitation system 104 via the network 904. A third-party system 908 can communicate with the inter-network facilitation system 104 to provide financial information pertaining to balances, transactions, and other information, whereupon the inter-network facilitation system 104 can provide corresponding information for display via the client device 906. In particular embodiments, a third-party system 908 communicates with the inter-network facilitation system 104 to update account balances, transaction histories, credit usage, and other internal information of the inter-network facilitation system 104 and/or the third-party system 908 based on user interaction with the inter-network facilitation system 104 (e.g., via the client device 906). Indeed, the inter-network facilitation system 104 can synchronize information across one or more third-party systems 908 to reflect accurate account information (e.g., balances, transactions, etc.) across one or more networked systems, including instances where a transaction (e.g., a transfer) from one third-party system 908 affects another third-party system 908.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

Each of the components of the account security management system 102 can include software, hardware, or both. For example, the components of the account security management system 102 can include one or more instructions stored on a computer-readable storage medium and executable by processors of one or more computing devices, such as a client device or server device. When executed by the one or more processors, the computer-executable instructions of the account security management system 102 can cause the computing device(s) to perform the methods described herein. Alternatively, the components of the account security management system 102 can include hardware, such as a special-purpose processing device to perform a certain function or group of functions. Alternatively, the components of the account security management system 102 can include a combination of computer-executable instructions and hardware.

Furthermore, the components of the account security management system 102 performing the functions described herein may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the account security management system 102 may be implemented as a stand-alone application, such as a desktop or mobile application. Furthermore, the components of account security management system 102 may be implemented as one or more web-based applications hosted on a remote server. The components of the account security management system 102 may also be implemented in a suite of mobile device applications or "apps."

What is claimed is:

1. A computer-implemented method comprising:

receiving, at an inter-network facilitation system, a user interaction associated with a secure digital account;

determining a fraud risk score corresponding to the user interaction;

based on the fraud risk score, assigning the secure digital account into a security tier;

applying security limitations to the secure digital account based on the security tier;

calculating a trust score corresponding with a client device associated with the secure digital account;

based on the trust score and the security tier, keeping the client device logged in while applying the security limitations to account actions;

requesting a personal identity verification from the client device;

based on receiving the personal identity verification from the client device associated with the secure digital account, comparing the personal identity verification from the client device associated with the secure digital account with stored information corresponding to the secure digital account; and based on determining that the personal identity verification associated with the secure digital account matches the stored information corresponding to the secure digital account, releasing the secure digital account from the security tier by removing the security limitations.

2. The computer-implemented method as recited in claim 1, further comprising:

calculating an additional trust score corresponding with an additional client device associated with the secure digital account; and based on the additional trust score and the security tier, logging out the additional client device associated with the secure digital account.

3. The computer-implemented method as recited in claim 1, wherein applying the security limitations to the secure digital account comprises limiting or denying access to at least one of the following account actions: physical card transactions, virtual card transactions, spending, withdrawal amounts, transactions within a geographic region, transactions with a particular merchant, friend-to-friend transfers, or secure digital account information.

4. The computer-implemented method as recited in claim 1, wherein the user interaction associated with the secure digital account comprises receiving an indication of a suspected fraudulent account activity.

5. The computer-implemented method as recited in claim 1, wherein receiving the personal identity verification from the client device associated with the secure digital account comprises receiving an image of an identification document.

6. The computer-implemented method as recited in claim 1, further comprising:

logging out the client device associated with the secure digital account based on applying the security limitations; and logging in the client device associated with the secure digital account based on releasing the secure digital account from the security tier by removing the security limitations.

7. The computer-implemented method as recited in claim 1, further comprising:

based on the security tier, providing, to the client device, a graphical user interface displaying transactions associated with the secure digital account, wherein the graphical user interface comprises selectable options to dispute or confirm the transactions associated with the secure digital account; and receiving, from the client device, an indication of a user selection of a selectable option to dispute a transaction.

8. The computer-implemented method as recited in claim 1, further comprising, based on releasing the secure digital account from the security tier, prompting the client device to change a password associated with the secure digital account.

9. The computer-implemented method as recited in claim 1, wherein calculating the trust score comprises determining whether the client device passed a previous scan identification event or identifying the client device as an initial enrollment device associated with the secure digital account.

10. The computer-implemented method as recited in claim 1, further comprising:

identifying one or more features associated with the user interaction; and utilizing a fraud risk machine-learning model to determine the fraud risk score based on the one or more features.

11. A non-transitory computer-readable medium storing instructions that, when executed by at least one processor, cause a computer device to:

receive, at an inter-network facilitation system, a user interaction associated with a secure digital account;

determine a fraud risk score corresponding to the user interaction;

based on the fraud risk score, assign the secure digital account into a security tier;

apply security limitations to the secure digital account based on the security tier;

calculate a trust score corresponding with a client device associated with the secure digital account;

based on the trust score and the security tier, keep the client device logged in while applying the security limitations to account actions;

request a personal identity verification from the client device;

based on receiving the personal identity verification from the client device associated with the secure digital account, compare the personal identity verification from the client device associated with the secure digital account with stored information corresponding to the secure digital account; and based on determining that the personal identity verification associated with the secure digital account matches the stored information corresponding to the secure digital account, release the secure digital account from the security tier by removing the security limitations.

12. The non-transitory computer-readable medium recited in claim 11, further comprising instructions that, when executed by the at least one processor, cause the computer device to:

determine an additional trust score corresponding with an additional client device associated with the secure digital account; and based on the additional trust score and the security tier, log out the additional client device associated with the secure digital account.

13. The non-transitory computer-readable medium recited in claim 11, wherein the user interaction associated with the secure digital account comprises receiving an indication of a suspected fraudulent account activity.

14. The non-transitory computer-readable medium recited in claim 11, wherein receiving the personal identity verification from the client device associated with the secure digital account comprises receiving an image of an identification document.

15. The non-transitory computer-readable medium recited in claim 11, further comprising instructions that, when executed by the at least one processor, cause the computer device to calculate the trust score by determining whether the client device passed a previous scan identification event or identify the client device as an initial enrollment device associated with the secure digital account.

16. The non-transitory computer-readable medium recited in claim 11, further comprising instructions that, when executed by the at least one processor, cause the computer device to:

identify one or more features associated with the user interaction; and utilize a fraud risk machine-learning model to determine the fraud risk score based on the one or more features.

17. A system comprising:

at least one processor; and at least one non-transitory computer-readable storage medium storing instructions that, when executed by the at least one processor, cause the system to:

receive, at an inter-network facilitation system, a user interaction associated with a secure digital account;

determine a fraud risk score corresponding to the user interaction;

based on the fraud risk score, assign the secure digital account into a security tier;

apply security limitations to the secure digital account based on the security tier;

calculate a trust score corresponding with a client device associated with the secure digital account;

based on the trust score and the security tier, keep the client device logged in while applying the security limitations to account actions;

request a personal identity verification from the client device;

based on receiving the personal identity verification from the client device associated with the secure digital account, compare the personal identity verification from the client device associated with the secure digital account with stored information corresponding to the secure digital account; and based on determining that the personal identity verification associated with the secure digital account matches the stored information corresponding to the secure digital account, release the secure digital account from the security tier by removing the security limitations.

18. The system recited in claim 17, further comprising instructions that, when executed by the at least one processor, cause the system to:

determine an additional trust score corresponding with an additional client device associated with the secure digital account; and based on the additional trust score and the security tier, log out the additional client device associated with the secure digital account.

19. The system recited in claim 17, further comprising instructions that, when executed by the at least one processor, cause the system to calculate the trust score by determining whether the client device passed a previous scan identification event or identify the client device as an initial enrollment device associated with the secure digital account.

20. The system recited in claim 17, further comprising instructions that, when executed by the at least one processor, cause the system to:

identify one or more features associated with the user interaction; and utilize a fraud risk machine-learning model to determine the fraud risk score based on the one or more features.

* * * * *